US010380801B1

(12) United States Patent
Flaherty-Woods et al.

(10) Patent No.: US 10,380,801 B1
(45) Date of Patent: Aug. 13, 2019

(54) HEAD WEARABLE DEVICE, SYSTEM, AND METHOD FOR DISPLAYING TEAMED ASSET INFORMATION

(71) Applicant: Rockwell Collins, Inc., Cedar Rapids, IA (US)

(72) Inventors: Emily M. Flaherty-Woods, Cedar Rapids, IA (US); Geoffrey A. Shapiro, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 19 days.

(21) Appl. No.: 15/891,190

(22) Filed: Feb. 7, 2018

(51) Int. Cl.
*G06T 19/00* (2011.01)
*G06F 3/01* (2006.01)
*G06F 3/0484* (2013.01)
*G06F 3/16* (2006.01)

(52) U.S. Cl.
CPC .......... *G06T 19/006* (2013.01); *G06F 3/012* (2013.01); *G06F 3/013* (2013.01); *G06F 3/04842* (2013.01); *G06F 3/167* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,693,702 B1* | 4/2010 | Kerner | ......... | G06T 19/006 345/629 |
| 2010/0091036 A1* | 4/2010 | Wright | ......... | G06T 19/006 345/633 |
| 2015/0153571 A1* | 6/2015 | Ballard | ......... | H04W 76/10 345/8 |

* cited by examiner

*Primary Examiner* — Jeffery A Brier
(74) *Attorney, Agent, or Firm* — Angel N. Gerdzhikov; Donna P. Suchy; Daniel M. Barbieri

(57) ABSTRACT

A head wearable device, a method, and a system. The head wearable device may include a display, a head tracking system, a user input system, and a processor. The processor may be configured to output a stream of image data to the display for presentation to the user, the image data associated with images aligned with a determined position and a determined orientation of the head of the user relative to an environment, the images including a user-selectable depiction of a teamed asset. The processor may be further configured to receive user input data from the user input system, wherein the user input data includes user selection data associated with a selected teamed asset. The processor may be further configured to update the stream of image data associated with the images such that the images further include a depiction of information associated with the selected teamed asset.

20 Claims, 19 Drawing Sheets

1900

1902 — OUTPUTTING, BY AT LEAST ONE PROCESSOR OF A HEAD WEARABLE DEVICE, A STREAM OF IMAGE DATA TO A DISPLAY OF THE HEAD WEARABLE DEVICE FOR PRESENTATION TO A USER OF THE HEAD WEARABLE DEVICE, THE IMAGE DATA ASSOCIATED WITH IMAGES ALIGNED WITH DETERMINED POSITION AND DETERMINED ORIENTATION OF A HEAD OF THE USER RELATIVE TO AN ENVIRONMENT, THE IMAGES INCLUDING AT LEAST ONE USER-SELECTABLE DEPICTION OF AT LEAST ONE UNMANNED VEHICLE

1904 — RECEIVING, BY THE AT LEAST ONE PROCESSOR OF THE HEAD WEARABLE DEVICE, USER INPUT DATA FROM A USER INPUT SYSTEM, WHEREIN THE USER INPUT DATA INCLUDES USER SELECTION DATA ASSOCIATED WITH A SELECTED UNMANNED VEHICLE OF THE AT LEAST ONE UNMANNED VEHICLE

1906 — UPDATING, BY THE AT LEAST ONE PROCESSOR OF THE HEAD WEARABLE DEVICE, THE STREAM OF IMAGE DATA ASSOCIATED WITH THE IMAGES SUCH THAT THE IMAGES FURTHER INCLUDE A DEPICTION OF INFORMATION ASSOCIATED WITH THE SELECTED UNMANNED VEHICLE

FIG.19

HEAD WEARABLE DEVICE, SYSTEM, AND METHOD FOR DISPLAYING TEAMED ASSET INFORMATION

BACKGROUND

The next generation of warfighters will operate in highly complex and dynamic battlespace, which increase the demands placed on human operators and/or pilots. One factor contributing to the complexity of future battlespace is manned unmanned teaming (MUM-T) operations. MUM-T operations describe a scenario in which a manned operator (e.g., in an airborne platform or on the ground) is controlling one or more unmanned platforms (e.g., unmanned vehicles).

Traditional avionics interfaces and interaction control methods are not satisfactory for managing and facilitating MUM-T operations. Pilots are currently unable to effectively control own-ship and multiple autonomous unmanned aerial system (UAS) assets within a battlespace.

Aviation operators (e.g., ground operators and airborne pilots) are currently task saturated due to the high demands of the operators' roles. Operators must manage multiple sensor information feeds and vehicle interfaces to perform mission responsibilities. MUM-T will require operators to assume new roles in addition to performing existing tasks. Currently, operators lack intuitive interfaces, which would enable the operators to manage the new responsibilities without a significant increase in workload.

Many of the existing pilot vehicle interfaces require pilots to perform head down data entry for extended periods of time. Such head down data entry redirects the pilots' focus from looking out and managing the battlespace environment to focusing inside the cockpit. Operators currently lack methods to enhance situational awareness and manage teamed assets in MUM-T operations.

Existing head wearable devices do not offer intuitive interaction methods to engage with any virtual content visualized on the device. Existing head wearable devices lack interaction and control methods to select, manipulate, and provide inputs to the computer generated content on the head wearable device.

SUMMARY

In one aspect, embodiments of the inventive concepts disclosed herein are directed to a head wearable device. The head wearable device may include a display, a head tracking system, a user input system, and a processor communicatively coupled to the display, the head tracking system, and the user input system. The display may be implemented in or on the head wearable device and configured to present imagery to a user of the head wearable device. The head tracking system may be implemented in or on the head wearable device. The head tracking system may be configured to determine a position and an orientation of a head of the user of the head wearable device relative to an environment, and output position and orientation data associated with the determined position and the determined orientation of the head of the user relative to the environment. The user input system may include at least one of an eye tracking system or a voice recognition system. The user input system may be configured to detect user inputs of the user of the head wearable device and output user input data. The processor may be configured to output a stream of image data to the display for presentation to the user, the image data associated with images aligned with the determined position and the determined orientation of the head of the user relative to the environment, the images including a user-selectable depiction of a teamed asset. The processor may be further configured to receive the user input data from the user input system, wherein the user input data includes user selection data associated with a selected teamed asset. The processor may be further configured to update the stream of image data associated with the images such that the images further include a depiction of information associated with the selected teamed asset.

In a further aspect, embodiments of the inventive concepts disclosed herein are directed to a method. The method may include outputting, by a processor of a head wearable device, a stream of image data to a display of the head wearable device for presentation to a user of the head wearable device, the image data associated with images aligned with a determined position and a determined orientation of a head of the user relative to an environment, the images including a user-selectable depiction of a teamed asset. The method may further include receiving, by the processor of the head wearable device, user input data from a user input system, wherein the user input data includes user selection data associated with a selected teamed asset. The method may further include updating, by the processor of the head wearable device, the stream of image data associated with the images such that the images further include a depiction of information associated with the selected teamed asset.

In a further aspect, embodiments of the inventive concepts disclosed herein are directed to a system. The system may include a computing device and a head wearable device. The computing device may include a processor and may be configured to output data. The head wearable device may be communicatively coupled to the computing device. The head wearable device may include a display, a head tracking system, a user input system, and a processor communicatively coupled to the display, the head tracking system, and the user input system. The display may be implemented in or on the head wearable device and configured to present imagery to a user of the head wearable device. The head tracking system may be implemented in or on the head wearable device. The head tracking system may be configured to determine a position and an orientation of a head of the user of the head wearable device relative to an environment, and output position and orientation data associated with the determined position and the determined orientation of the head of the user relative to the environment. The user input system may include at least one of an eye tracking system or a voice recognition system. The user input system may be configured to detect user inputs of the user of the head wearable device and output user input data. The processor may be configured to output a stream of image data to the display for presentation to the user, the image data associated with images aligned with the determined position and the determined orientation of the head of the user relative to the environment, the images including a user-selectable depiction of a teamed asset. The processor may be further configured to receive the user input data from the user input system, wherein the user input data includes user selection data associated with a selected teamed asset. The processor may be further configured to update the stream of image data associated with the images such that the images further include a depiction of information associated with the selected teamed asset.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 19 is a diagram of an exemplary embodiment of a method according to the inventive concepts disclosed herein.

DETAILED DESCRIPTION

Figure 1:
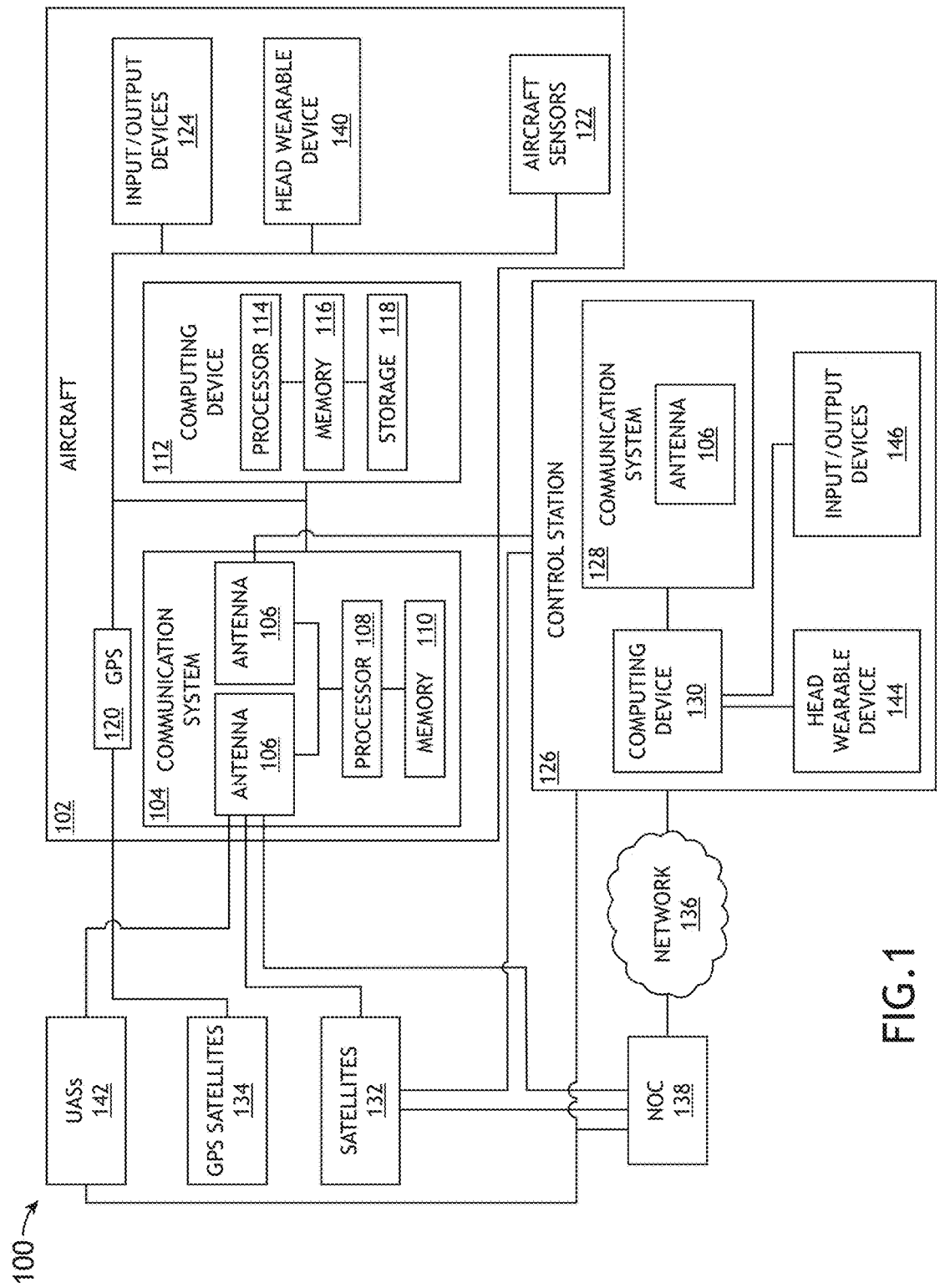
FIG. 1 is a view of an exemplary embodiment of a system according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method, system, and head wearable device including a processor, a display, a head tracking system, and a user input system (e.g., an eye tracking system and/or a voice recognition system). The head wearable device may provide a user (e.g., an operator on the ground or in the air) with enhanced battlespace management capabilities and an intuitive interface to command and manage MUM-T operations. The processor may be configured to generate graphical images (e.g., symbology, text, and/or depictions), which, for example, may represent teamed assets and battlespace features. Such generated graphical images may be aligned with a determined position and a determined orientation of the head of the user relative to an environment or environmental feature and output to the display for presentation to the user. Assets may refer to vehicles (manned vehicles and/or unmanned vehicles; e.g., aircraft (e.g., manned aircraft and/or unmanned aerial systems (UASs)), spacecraft, ground vehicles (e.g., automobiles and/or tanks), ships, and/or submarines), soldiers, military installations, and/or bases; likewise, teamed assets may refer to friendly assets. For example, battlespace features may include sensor ranges, weapon ranges, targeting information, landing zones, and/or threat areas. Additionally, the integration of the eye tracking system and/or the voice recognition system with the head wearable device allows for new user interface capabilities, such as for managing teamed assets in a battlespace. The head wearable device may be implemented as a virtual reality head wearable device and/or an augmented reality head wearable device. For example, the head wearable device may provide pilots and/or ground operators a means for enhanced battlespace management and an intuitive interface to command and manage MUM-T operations. The head wearable device may assist operators in managing complex threat environments and intensive joint force operations. The head wearable device may enable a manned operator to manage MUM-T operations without a significant increase in workload. The head wearable device may enable a head-up, eyes-out means for enhanced battlespace situational awareness and may provide a solution for operators to direct, visualize, and manage MUM-T operations.

Some embodiments may include the use of augmented reality or virtual reality symbology to indicate the location of friendly, enemy, neutral, or unknown battlespace entities. For example, the processor of the head wearable device may generate symbology and output the symbology to the display, where the symbology is displayed and overlaid on a location of real entities in a battlespace environment. Additional stereoscopic and perspective symbology may be rendered on the display of the head wearable device to illustrate entities' sensor and weapons ranges, targeting information, landing zones, threat areas, and other battlespace features. Further, virtual content such as MUM-T menus related to asset status, tasks, and capabilities may be generated by the processor and displayed by the display based on mission context. Some embodiments may include a human machine interface (HMI) and alerting schema to direct a pilot's view toward threats and other assets, which are out of the pilot's field of view. Such alerting schema may alert the pilot of a high priority threat or high priority information that requires immediate action. The HMI and alerting schema may direct the pilot toward a direction of the asset and/or threat or display critical information within the pilot's current field of view. Additionally, the head wearable device may be configured to display sensor and targeting information transmitted from other teamed assets (e.g., from teamed UASs). Further, the head wearable device and a head down display (HDD) may be communicatively coupled and synched such that the pilot, by using the head wearable device and/or the HDD, can select a teamed asset and a format will be displayed adjacent to that asset, for example, to present sensor feeds, targeting information, streaming video, images, voice, or other data from the selected teamed asset. In some embodiments, the pilot may select a threat area or a particular enemy asset and a format will be displayed adjacent to the selected threat area or the particular enemy asset to show intelligence information being collected on the selected threat area or the particular enemy asset, where such intelligence information may be transmitted and provided from any of various teamed assets.

In some embodiments, the head wearable device may be used to show classified content to a wearing user of the head wearable device in an unclassified environment (e.g., a room with people not authorized to view classified information or in a cockpit/aircraft with unclassified crew members) such that only the wearing user may view classified content on the head wearable device while other people, who might lack a requisite classified clearance level, near the wearing user might only see unclassified or less classified information on other displays in the open environment. For example, some MUM-T operations and datalinks will involve classified information; however, not all platforms involved in MUM-T operations may be authorized to handle classified information. As such, the head wearable device may be implemented as a secured device certified to store and display classified information such that only the cleared operators wearing the device would see the classified content and could bring the head wearable device to other platforms to work in unclassified environments. The head wearable device may be used to show classified content in the in the battlespace, overlay virtual content on a HDD, or show virtual displays and/or formats of classified content. For example, the head wearable device may limit the need for entire platforms to be classified or for an entire flight crew to be cleared to handle classified content.

Referring now to FIG. 1, an exemplary embodiment of a system 100 according to the inventive concepts disclosed herein includes at least one aircraft 102, a control station 126, satellites 132, global positioning system (GPS) satellites 134, a network 136, a network operations center (NOC) 138, and UASs 142. Some or all of the aircraft 102, the control station 126, the satellites 132, the GPS satellites 134, the network 136, the NOC 138, and the UASs 142 may be communicatively coupled at any given time.

The aircraft 102 includes at least one communication system 104, a plurality of computing devices 112 (which may also be referred to as aircraft computing devices, helicopter computing devices, or vehicular computing devices as may be appropriate), a GPS device 120, aircraft sensors 122, input/output devices 124, and at least one head wearable device 140, as well as other systems, equipment, and devices commonly included in aircraft. Some or all of the communication system 104, the computing devices 112, the GPS device 120, the aircraft sensors 122, the input/output devices 124, the head wearable device 140, and any other systems, equipment, and devices commonly included in the aircraft 102 may be communicatively coupled. While not shown, in some embodiments, the aircraft 102 may optionally include a NOC or include components (e.g., at least one computing device 112 and/or the communication system 104) configured to perform functionality similar to the NOC 138. The aircraft 102 may be implemented as any suitable aircraft, such as a helicopter or airplane. The aircraft 102 may be a manned aircraft. While the system 100 is exemplarily shown as including the aircraft 102, in some embodiments the inventive concepts disclosed herein may be implemented in or on any suitable vehicle (e.g., an automobile, train, submersible craft, watercraft, or spacecraft) or in any suitable environment.

The communication system 104 includes one or more antennas 106 (e.g., two antennas 106, as shown), a processor 108, and memory 110, which are communicatively coupled. The communication system 104 (such as via one or more of the antennas 106) is configured to send and/or receive signals, data, messages, and/or voice transmissions to and/or from the control station 126, other vehicles (e.g., the UASs 142), the satellites 132, the NOC 138, and combinations thereof, as well as any other suitable devices, equipment, or systems. That is, the communication system 104 is configured to exchange (e.g., bi-directionally exchange) signals, data, messages, and/or voice communications with any other suitable communication system (e.g., which may be implemented similarly and function similarly to the communication system 104). Additionally, for example, the communication system 104 may be configured to exchange, send, and/or receive (e.g., via a wireless connection, a cabled connection, and/or a wired connection, or a combination thereof) signals, data, messages, and/or voice communications with, to, and/or from any suitable onboard device(s).

The communication system 104 may include at least one processor 108 configured to run or execute various software applications, computer code, and/or instructions stored (e.g., maintained) in at least one non-transitory computer-readable medium (e.g., at least one computer-readable medium implemented as hardware; e.g., at least one non-transitory processor-readable medium, at least one memory 110 (e.g., at least one nonvolatile memory, at least one volatile memory, or a combination thereof; e.g., at least one random-access memory, at least one flash memory, at least one read-only memory (ROM) (e.g., at least one electrically erasable programmable ROM (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof). Some or all of the at least one computer-readable medium may be communicatively coupled. For example, the processor 108 may be configured to receive data from the computing devices 112 and/or the head wearable device 140 and execute instructions configured to cause a particular antenna of the antennas 106 to transmit the data as a signal(s) to the UASs 142 and/or another communication system (e.g., 128) of the system 100. Likewise, for example, the processor 108 may be configured to route data received as a signal(s) by a particular antenna of the antennas 106 to one or more of the computing devices 112 and the head wearable device 140. In some embodiments, the processor 108 may be implemented as one or more radiofrequency (RF) processors.

Each of the antennas 106 may be implemented as or may include any suitable antenna or antenna device. For example, the antennas 106 may be implemented as or include at least one electronically scanned array (ESA) (e.g., at least one active ESA (AESA)), at least one radio (e.g., at least one software defined radio (SDR)), at least one transmitter, at least one receiver, at least one transceiver, or a combination thereof.

While the communication system 104 is shown as having two antennas 106, one processor 108, and memory 110, the communication system 104 may include any suitable number of antennas 106, processors 108, and memory 110. Further, the communication system 104 may include other components, such as a storage device (e.g., solid state drive or hard disk drive), radio tuners, and controllers.

Each of the computing devices 112 of the aircraft 102 may include at least one processor 114, memory 116, and storage 118, as well as other components, equipment, and/or devices commonly included in a computing device, all of which may be communicatively coupled to one another. Each of the computing devices 112 may be configured to route data to each other as well as to the head wearable device 140 and/or the communication system 104 for transmission to an off-board destination (e.g., satellites 132, NOC 138, control station 126, and/or UASs 142). Likewise, each computing device 112 may be configured to receive data from another computing device 112 as well as from the head wearable device 140 and/or the communication system 104 transmitted from off-board sources (e.g., satellites 132, NOC 138, control station 126). The computing device 112 may include or may be implemented as and/or be configured to perform the functionality of any suitable aircraft system, such as an engine indication and crew alerting system (EICAS) computing device (e.g., 112-2), a flight management system (FMS) computing device (e.g., 112-3), an integrated flight information system (IFIS) computing device (e.g., 112-4), an information management system (IMS) computing device (e.g., 112-5), an onboard maintenance system (OMS) computing device (e.g., 112-6), and a terrain awareness and warning system (TAWS) computing device (e.g., 112-7). (See, e.g., FIG. 8.) The processor 114 may be configured to run various software applications or computer code stored (e.g., maintained) in a non-transitory computer-readable medium (e.g., memory 116 or storage 118) and configured to execute various instructions or operations. Additionally, for example, the computing devices 112 or the processors 114 may be implemented as special purpose computers or special purpose processors configured (e.g., programmed) to execute instructions for performing any or all of the operations disclosed throughout. In some embodiments, the aircraft 102 may include any suitable number of computing devices 112.

In some embodiments, one of the computing devices 112 may be configured to receive position and orientation data (e.g., a stream of position and orientation data) from the head wearable device 140, wherein the position and orientation data is indicative of a position and orientation of the user's head. For example, the computing device 112 may be configured to receive position and orientation data from the head tracking system 408 of the head wearable device 140. Based at least on the position and orientation data, the processor 114 may be configured to generate a virtual image (e.g., a virtual scene image) corresponding to a field of view of the wearer of the head wearable device 102. The processor may be configured to output the virtual image as virtual image data to the head wearable device 140. The processor 114 may be configured to generate a stream of virtual images and output the stream of virtual images as a stream of virtual image data to the head wearable device 140.

The GPS device 120 receives location data from the GPS satellites 134 and may provide vehicular location data (e.g., aircraft location data) to any of various equipment/systems of the aircraft 102 (e.g., the communication system 104, the computing devices 112, the aircraft sensors 122, the input/output devices 124, and the head wearable device 140). The GPS device 120 may include a GPS receiver and a processor. For example, the GPS device 120 may receive or calculate location data from a sufficient number (e.g., at least four) of GPS satellites 134 in view of the aircraft 102 such that a GPS solution may be calculated. In some embodiments, the GPS device 120 may be implemented as or as part of a computing device 112, the communication system 104, navigation sensors of the aircraft sensors 122, and/or one of the input/output devices 124. The GPS device 120 may be configured to provide the location data to any of various equipment/systems of a vehicle. For example, the GPS device 120 may provide location data to the computing devices 112, the communication system 104, head wearable device 140, and the input/output devices 124. Further, while FIG. 1 depicts the GPS device 120 implemented in the aircraft 102, in other embodiments, the GPS device 120 may be implemented in or on any type of vehicle, such as automobiles, spacecraft, trains, watercraft, or submersible craft.

While the communication system 104, the computing devices 112, the GPS device 120, the aircraft sensors 122, the input/output devices 124, and the head wearable device 140 of the aircraft 102 have been exemplarily depicted as being implemented as separate devices or systems, in some embodiments, some or all of the communication system 104, the computing devices 112, the GPS device 120, the aircraft sensors 122, and/or the input/output devices 124 may be implemented as a single integrated system or device or as any number of integrated and/or partially integrated systems and/or devices.

The control station 126 may include at least one communication system 128, at least one computing device 130, at least one head wearable device 144, and input/output devices 146, as well as other systems, equipment, and devices commonly included in a control station. Some or all of the communication system 128, the computing device 130, the head wearable device 144, the input/output devices 146, and other systems, equipment, and devices commonly included in a control station may be communicatively coupled. The control station 126 may be implemented as a fixed location ground control station (e.g., a ground control station of an air traffic control tower, or a ground control station of a network operations center (e.g., 138)) located on the ground of the earth. In some embodiments, the control station 126 may be implemented as a mobile ground control station (e.g., a ground control station implemented on a non-airborne vehicle (e.g., an automobile or a ship) or a trailer). In some embodiments, the control station 126 may be implemented as an air control station implemented on an airborne vehicle (e.g., aircraft). The control station 126 may include a NOC or be communicatively coupled to the NOC 138 (e.g., via the network 136). For example, an operator located at the control station 126 may wear the head wearable device 144 to and be able to direct, visualize, and control MUM-T operations.

The communication system 128 and components thereof (such as antenna 106) of the control station 126 may be implemented similarly to the communication system 104 except that, in some embodiments, the communication system 128 may be configured for operation at a fixed location. The computing device 130 and components thereof (such as a processor (not shown) and memory (not shown)) of the control station 126 may be implemented similarly to the computing devices 112. The head wearable device 144 may be implemented similarly to the head wearable device 140 except that, in some embodiments, the head wearable device 140 may be configured for operation at a fixed location. The input/output devices 146 may be implemented similarly to input/output devices 124 except that, in some embodiments, the input/output devices 146 may be configured for operation at a fixed location.

While the antennas 106 are exemplarily depicted as being implemented in the aircraft 102 and the control station 126, in some embodiments, antennas 106 may be implemented in, on, or coupled to any other suitable device, equipment, or system, such as the UASs 142, a computing device (e.g., a laptop computing device, a mobile computing, a wearable computing device, or a smart phone), a mobile communication system (e.g., a man pack communication system), or satellites 132.

The network 136 may be implemented as any suitable network or combination of networks. For example, the network 136 may include or be implemented as the internet, a portion of the internet (such as a secured optical fiber network), an intranet, a wide area network (WAN), a local area network (LAN), and/or a mobile telecommunications network (e.g., a third generation (3G) network or a fourth generation (4G) network)). While the system 100 is exemplarily shown as including the network 136, the system 100 or various components of the system 100 may include or be communicatively coupled via any suitable number and any suitable types of networks.

The NOC 138 may connect a particular type of communications (e.g., satellite communications with the satellites 132 and/or aircraft communications with the aircraft 102 and/or the UASs 142) with the network 136.

The UASs 142 may be implemented similarly to the aircraft 102, except that, the UASs are configured for unmanned operation.

While FIG. 1 exemplarily includes elements as shown, in some embodiments, one or more of the elements of the system 100 may be omitted, or the system 100 may include other elements. For example, one or more of the GPS satellites 134, satellites 132, the control station 126, the network 136, the NOC 138, or the UASs 142 may be optional. Additionally, while an embodiment has been depicted as including one control station (e.g., the control station 126), other embodiments may include any number of control stations of various types positioned or moving anywhere in the system 100.

Figure 2:
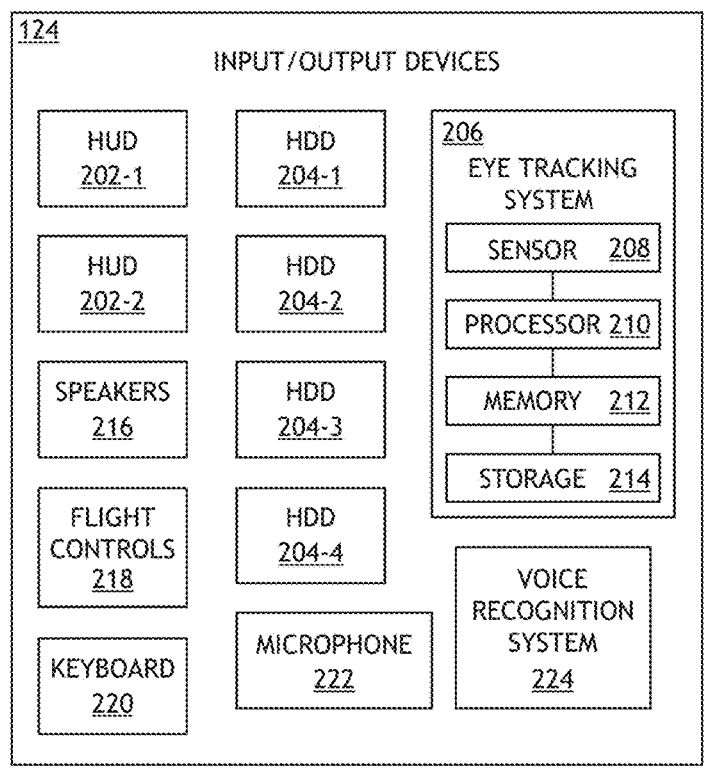
FIG. 2 is a view of the input/output devices of the aircraft of FIG. 1 according to the inventive concepts disclosed herein.

Referring now to FIG. 2, the input/output devices 124 of the aircraft 102 of FIG. 1 may include one or more displays (e.g., at least one head-up display (HUD), at least one HDD, at least one adaptive flight display (AFD), or a combination thereof), at least one eye tracking system 206, speakers 216, flight controls 218, at least one keyboard 220, at least one microphone 222, at least one voice recognition system 224, or a combination thereof, some or all of which may be communicatively coupled at any given time. While FIG. 2 depicts the various exemplary input/output devices 124, the input/output devices 124 may include any suitable input/output devices.

For example, the displays of the input/output devices 124 may include two HUDs 202-1, 202-2 (which may collectively be referred to as HUDs 202) and four HDDs 204-1, 204-2, 204-3, 204-4 (which may collectively be referred to as HDDs 204). Each of the HUDs 202 and the HDDs 204 may be configured to present streams of images (e.g., as video or still images) to a user (e.g., a pilot or an operator). In some embodiments, the HUDs 202 and/or HDDs 204 may be implemented as or include a touchscreen display. In some embodiments, one or more of the HUDs 202 and the HDDs 204 may include an integrated computing device (which may be implemented and function similarly to one of the computing devices 112 of FIG. 1) and/or integrated computing device components (which may be implemented and function similarly to components of one of the computing devices 112 of FIG. 1). Each of the HUDs 202 and the HDDs 204 may be communicatively coupled to one or more of the computing devices 112, the communication system 104, the GPS device 120, the head wearable device 140, other of the input/output devices 124, and/or the aircraft sensors 122 of FIG. 1.

The eye tracking system 206 is configured to track eye gestures, track movement of a user's eye, track a user's gaze, and/or otherwise receive inputs from a user's eyes. The eye tracking system 206 may be configured for performing fully automatic eye tracking operations of users in real time. The eye tracking system 206 may include at least one sensor 208, at least one processor 210, a memory 212, and a storage 214, as well as other components, equipment, and/or devices commonly included in an eye tracking system. The sensor 208, the processor 210, the memory 212, and the storage 214, as well as the other components, equipment, and/or devices commonly included in the eye tracking system 206 may be communicatively coupled.

Each sensor 208 may be implemented as any of various sensors suitable for an eye tracking system. For example, the at least one sensor 208 may include or be implemented as one or more optical sensors (e.g., at least one camera configured to capture images in the visible light spectrum and/or the infrared spectrum). In some embodiments, the at least one sensor 208 is one or more dedicated eye tracking system sensors. While the sensor 208 has been exemplarily depicted as being included in the eye tracking system 206, in some embodiments, the sensor 208 may be implemented external to the eye tracking system 206. For example, the sensor 208 may be implemented as an optical sensor (e.g., of the optical sensors 316 of the aircraft sensors 122) located within the aircraft 102 and communicatively coupled to the processor 210.

The processor 210 may be configured to process data received from the sensor 208 and output processed data to one or more onboard devices or onboard systems (e.g., the communication system 104, the computing devices 112, the aircraft sensors 122, other of the input/output devices 124, the head wearable device 140, or a combination thereof). For example, the processor 210 may be configured to generate eye tracking data and output the generated eye tracking data to one of the computing devices 112 and/or the head wearable device 140. The processor 210 of the eye tracking system 206 may be configured to run various software applications or computer code stored (e.g., maintained) in a non-transitory computer-readable medium (e.g., memory 212 and/or storage 214) and configured to execute various instructions or operations. The processor 210 may be implemented as a special purpose processor configured to execute instructions for performing any or all of the operations disclosed throughout.

Figure 4:
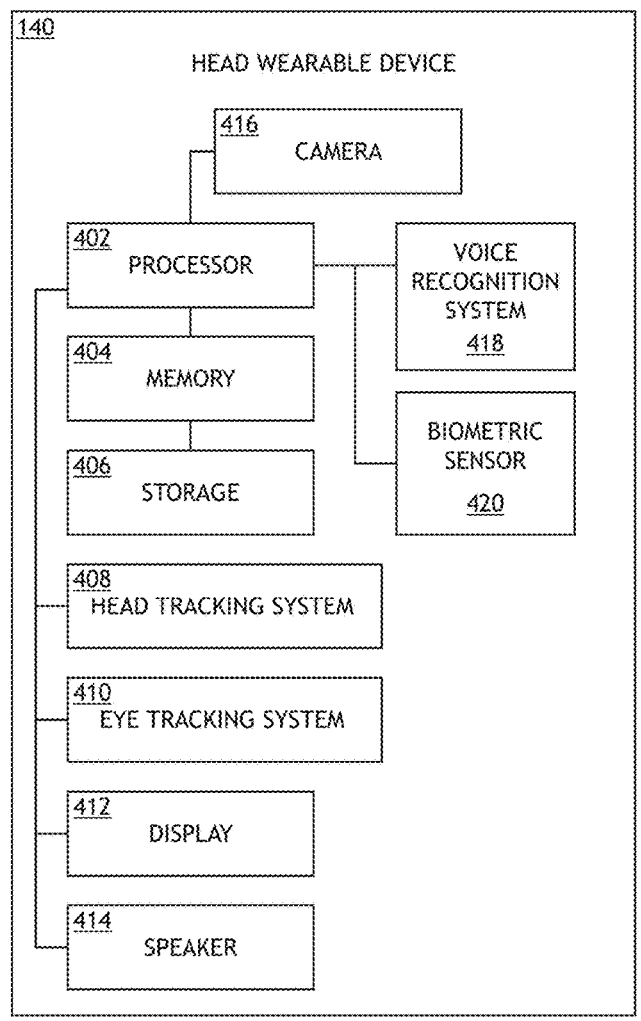
FIG. 4 is a view of the head wearable device of the aircraft of FIG. 1 according to the inventive concepts disclosed herein.
Figure 7:
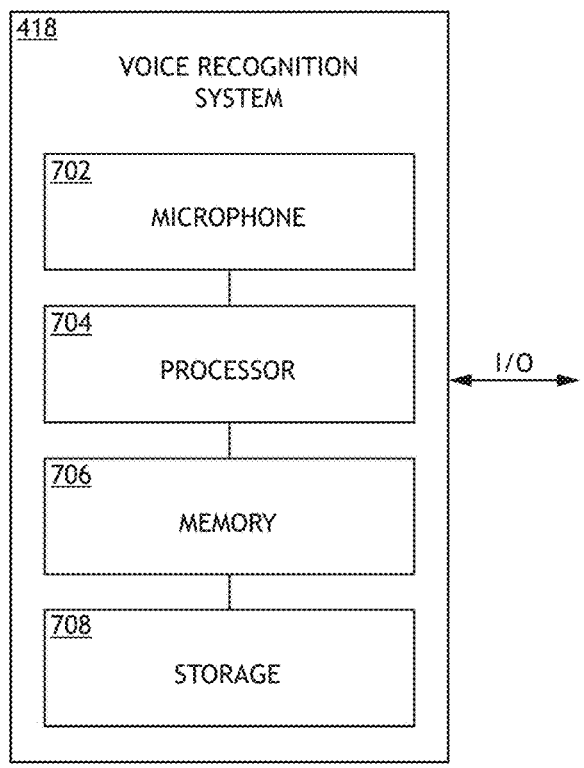
FIG. 7 is a view of the voice recognition system of the head wearable device of FIG. 4 according to the inventive concepts disclosed herein.

The voice recognition system 224 may be implemented similarly to the voice recognition system 418 shown in and described with respect to FIGS. 4 and 7.

In some embodiments, some or all of the input/output devices 124 may include an integrated computing device (which may be implemented and function similarly to one of the computing devices 112 of FIG. 1) and/or integrated computing device components (which may be implemented and function similarly to components of one of the computing devices 112 of FIG. 1).

Figure 3:
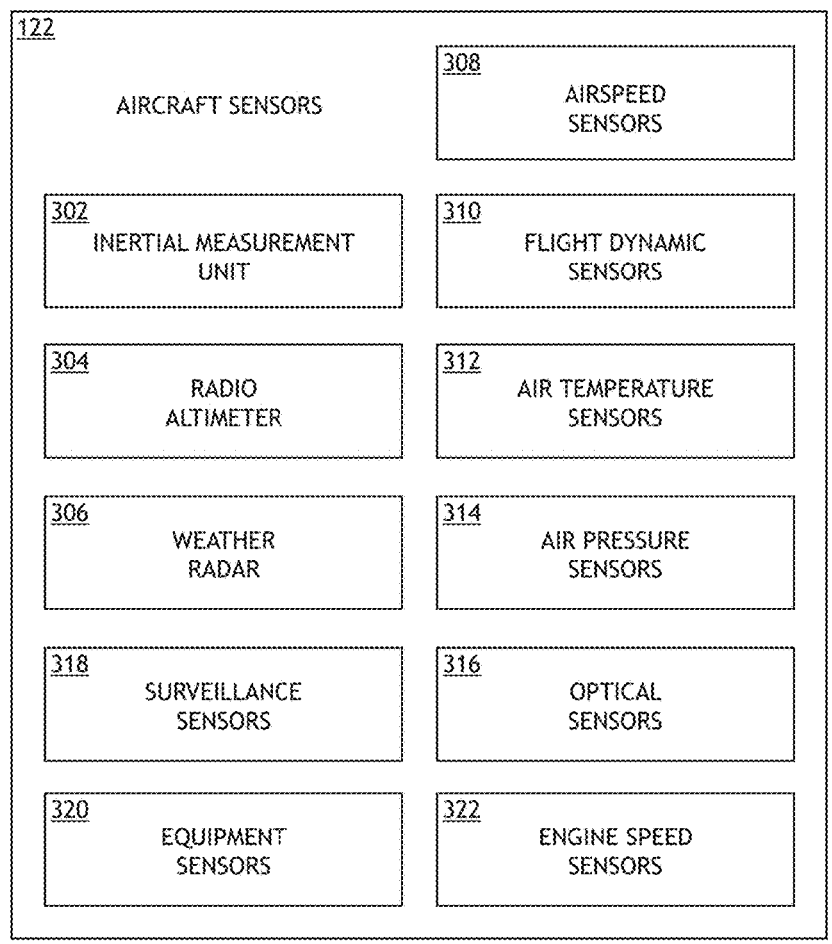
FIG. 3 is a view of the aircraft sensors of the aircraft of FIG. 1 according to the inventive concepts disclosed herein.

Referring now to FIG. 3, the aircraft sensors 122 of FIG. 1 are shown. Each of the aircraft sensors 122 may be configured to sense a particular condition(s) external to the aircraft 102 or within the aircraft 102 and output data associated with particular sensed condition(s) to one or more onboard devices or onboard systems (e.g., the communication system 104, the computing devices 112, the aircraft sensors 122, the input/output devices 124, the head wearable device 140, or a combination thereof). For example, the aircraft sensors 122 may include an inertial measurement unit 302, a radio altimeter 304, radar (e.g., weather 306, surveillance radar, and/or weapon radar), airspeed sensors 308, flight dynamic sensors 310 (e.g., configured to sense pitch, roll, and/or yaw), air temperature sensors 312, air pressure sensors 314, optical sensors 316 (e.g., cameras configured to capture images in the visible light spectrum and/or the infrared spectrum, such as forward looking infrared (FLIR) cameras and/or short-wavelength infrared (SWIR) cameras), sound ranging sensors (not shown), surveillance sensors 318, equipment sensors 320 (e.g., electrical system sensors, hydraulic system sensors, bleed air sensors, environmental conditioning sensors, fuel sensors, and/or fire warning/suppression sensors), and/or engine speed sensors 322, some or all of which may be communicatively coupled at any given time. Additionally, the GPS device 120 may be considered as one of the aircraft sensors 122.

For example, at least some of the aircraft sensors 122 may be implemented as navigation sensors (e.g., the GPS device 120, the inertial measurement unit 302, a radio altimeter 304, weather radar 306, airspeed sensors 308, flight dynamic sensors 310, air temperature sensors 312, and/or air pressure sensors 314) configured to sense any of various flight conditions or aircraft conditions typically used by aircraft and output navigation data (e.g., aircraft location data, aircraft orientation data, aircraft direction data, aircraft speed data, and/or aircraft acceleration data). For example, various flight conditions or aircraft conditions may include altitude, aircraft location (e.g., relative to the earth), aircraft orientation (e.g., relative to the earth), aircraft speed, aircraft acceleration, aircraft trajectory, aircraft pitch, aircraft roll, aircraft yaw, air temperature, and/or air pressure. For example, the GPS device 120 and the inertial measurement unit 302 may provide aircraft location data and aircraft orientation data, respectively, to a processor (e.g., a processor of the GPS device 120, processor 114, processor 114-1, processor 108, processor 210, processor 402, or a combination thereof).

In some embodiments, some or all of the aircraft sensors 122 may include an integrated computing device (which may be implemented and function similarly to one of the computing devices 112 of FIG. 1) and/or integrated computing device components (which may be implemented and function similarly to components of one of the computing devices 112 of FIG. 1).

Further, while the aircraft sensors 122 are implemented in or on the aircraft 102, some embodiments may include vehicle sensors implemented on any suitable vehicle according to the inventive concepts disclosed herein.

Referring now to FIGS. 4-7, an exemplary embodiment of the head wearable device 140 according to the inventive concepts disclosed herein is shown. The head wearable device 140 may be implemented as an augmented reality head wearable device or a virtual reality head wearable device. The head wearable device 140 may be implemented as an occluded or a transmissive head wearable device. The head wearable device 140 may be configured to receive image data (e.g., augmented reality image data and/or virtual reality image data) from one of the computing devices 112. For example, the head wearable device 140 may be configured to provide a wearer of the head wearable device 140 with an augmented reality experience by blending and/or overlaying virtual images with and/or on real images (e.g., real scene images) to create combined three-dimensional immersive scene images, which are presented to the wearer of the head wearable device 102. Additionally, for example, the head wearable device 140 may be configured to provide a wearer of the head wearable device 140 with a virtual reality experience by blending and/or overlaying virtual images (e.g., symbology, text, and/or depictions) with and/or on a synthetic environment.

The head wearable device 140 may be configured to present augmented reality or virtual reality scene images to the wearer of the head wearable device 140. The head wearable device 140 may include at least one processor 402, at least one memory 404, at least one storage device 406, a head tracking system 408, a user input system (e.g., an eye tracking system 410 and/or a voice recognition system 418), at least one display 412, at least one speaker 414, at least one camera 416, and at least one biometric sensor 420, some or all of which may be communicatively coupled.

The processor 402 may be implemented as any suitable processor, such as a general purpose processor, an image processor, and/or a field-programmable gate array (FPGA). The processor 402 may be configured to receive data (e.g., image data associated with images (e.g., assets and battlespace features) to be overlaid on a user's field of view or overlaid on a virtual image of an environment and/or virtual image data associated with virtual images of an environment) from one of the computing devices 112. Such received data may be aligned with determined position and determined orientation of the head of the user relative to the environment. The processor 402 may be configured to generate graphical images (e.g., symbology, text, and/or depictions), which, for example, may represent teamed assets and battlespace features. Such generated graphical images may be aligned with determined position and determined orientation of the head of the user relative to the environment. The processor 402 may be configured to output the graphical images to the display 412 for presentation to the user. In some embodiments, the graphical images are augmented reality graphical images that augment a user's real world view on a see-through display of the head wearable device 140. In some embodiments, the graphical images are overlaid on virtual images to provide an enhanced virtual reality experience for a user wearing an occluded head wearable device. For example, the processor 402 of the head wearable device 140 may generate symbology and output the symbology to the display 412, where the symbology is displayed and overlaid on a location of real entities in a battlespace environment. For example, the symbology may indicate the location of friendly, enemy, neutral, or unknown battlespace entities. Additionally, the symbology illustrate entities' sensor and weapons ranges, targeting information, landing zones, threat areas, and other battlespace features. Further, the processor 402 may generate virtual content, such as such as MUM-T menus related to asset status, tasks, and capabilities, and output such virtual content to the display 412 based on mission context. In some embodiments, the processor 402 may generate an alerting schema (e.g., a blinking arrow near an edge of the display 412) to direct a pilot's view toward threats and other assets, which are out of the pilot's field of view, and output the alerting schema to the display 412. Additionally, for example, the processor 402 may receive sensor and targeting information transmitted from other teamed assets (e.g., from teamed UASs 142), generate graphical images associated with the sensor and targeting information, and output the graphical images to the display 412.

For example, the processor 402 may be configured to generate and output a stream of image data to the display 412 for presentation to the user. The image data may be associated with images aligned with the determined position and the determined orientation of the head of the user relative to the environment, and the images may including any of various assets and battlespace features. For example, the images may include at least one user-selectable depiction of at least one unmanned vehicle (e.g., UAS 142). The processor 402 may be configured to receive user input data from the user input system (e.g., the eye tracking system 410 and/or the voice recognition system 418), wherein the user input data includes user selection data associated with a selected unmanned vehicle of the at least one unmanned vehicle. Additionally, the processor 402 may be configured to update the stream of image data associated with the images such that the images further include a depiction of information associated with the selected unmanned vehicle. For example, the depiction of information associated with the selected unmanned vehicle may include a depiction of sensor feed data captured by at least one sensor of the selected unmanned vehicle. Additionally, for example, the information associated with the selected unmanned vehicle may include information of at least one of status, tasks, or capabilities of the selected unmanned vehicle.

The processor 402 may be configured to receive user input data from the user input system. For example, the user input data may include users selection data associated with user selections of various assets or battlespace features. Additionally, the user input data may include user command data associated with various user commands. For example, the user input data may include user command data associated with a command to control a selected unmanned vehicle.

In some embodiment, the image data that the processor 402 outputs to the display 412 is battlespace image data associated with images of a battlespace. For example, the images of the battlespace may include depiction of battlespace features and assets. For example, the images associated with the image data may include user-selectable depictions of battlespace objects, and the processor 402 may receive user selection data associated with a selected battlespace object of the battlespace objects. In response to receiving the user selection data, the processor 402 may update the stream of image data associated with the images such that the images further include a depiction of information associated with the selected battlespace object. Additionally, for example, the processor 402 may receive user command data associated with a command to surveil the selected battlespace object, and the processor 402 may output a command to control a particular unmanned vehicle to surveil the selected battlespace object. Further, for example, the processor 402 may receive user command data associated with a command to attack the selected battlespace object, and the processor 402 may output a command to control a particular unmanned vehicle to attack the selected battlespace object. In some embodiments, each user-selectable depiction of a battlespace object includes graphical information indicative of whether each battlespace object is classified as friendly, neutral, enemy, or unknown threat. For example, where the selected battlespace object is currently classified as unknown threat, the processor 402 may receive user command data associated with a command to classify the selected battlespace object, and the processor 402 may output a command to classify the selected battlespace object as friendly, neutral, or enemy.

In some embodiments, the processor 402 may generate image data associated with a depiction of information classified to a predetermined classification level. For example, the processor 402 may be configured to verify an identity of the user of the head wearable device 140 based at least on biometric information obtained from the biometric sensor 420 and determine a predetermined classification level of the user based at least on the identity. Additionally, the processor 402 may output a stream of image data to the display 412 such that the stream of image data corresponds to the predetermined classification level of the user.

In some embodiments, the processor 402 may be configured to receive real images as real image data from the camera 416. The processor 108 may be configured to generate graphical images (e.g., symbology, text, and/or depictions), which, for example, may represent teamed assets and battlespace features, and overlay the graphical images on the real image data to form combined image data, and the processor 402 may be configured to output the combined image data to the display 412.

In some embodiments, the at least one processor 402 may be implemented as a plurality of processors, such as at least one general purpose processor and at least one image processor. The processor 402 may be configured to run various software applications or computer code stored in a non-transitory computer-readable medium (e.g., memory 404 and/or storage device 406) and configured to execute various instructions or operations. The processor 402 may be implemented as a special purpose processor configured to execute instructions for performing any or all of the operations disclosed throughout.

Figure 6:
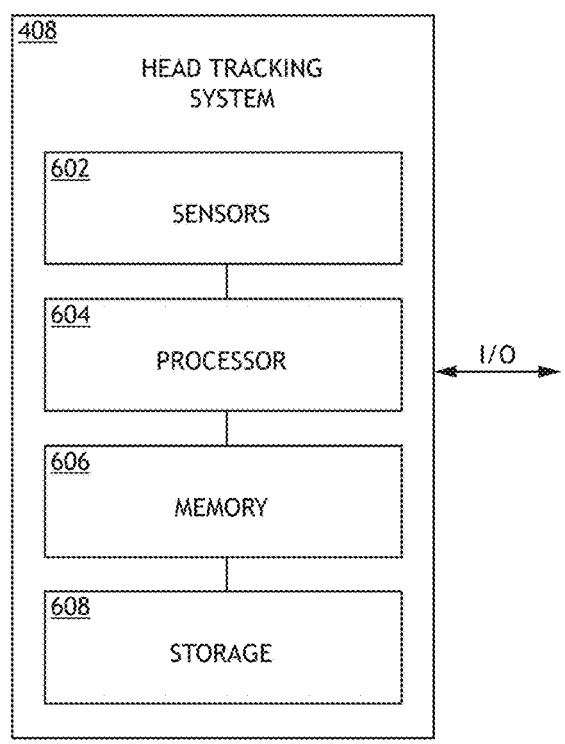
FIG. 6 is a view of the head tracking system of the head wearable device of FIG. 4 according to the inventive concepts disclosed herein.

The head tracking system 408 may be configured to determine and track a position and an orientation of a user's head relative to an environment. The head tracking system 408 may be configured for performing fully automatic head tracking operations in real time. As shown in FIG. 6, the head tracking system 408 may include sensors 602, a processor 604, memory 606, and storage 608, as well as other components, equipment, and/or devices commonly included in a head tracking system. The sensors 602, the processor 604, the memory 606, and the storage 608, as well as the other components, equipment, and/or devices commonly included in a head tracking system may be communicatively coupled.

The processor 604 of the head tracking system 408 may be configured to process data received from the sensors 602 and output processed data to one of the computing devices 112 and/or the processor 402 for use in generating images aligned with the user's field of view. For example, the processor 604 may be configured to determine and track a position and orientation of a user's head relative to an environment. Additionally, for example, the processor 604 may be configured to generate position and orientation data associated with such determined information and output the generated position and orientation data to one of the computing devices 112 and/or the processor 402. The processor 604 of the head tracking system 408 may be configured to run various software applications or computer code stored in a non-transitory computer-readable medium and configured to execute various instructions or operations. The processor 604 may be implemented as a special purpose processor configured to execute instructions for performing any or all of the operations disclosed throughout.

Figure 5:
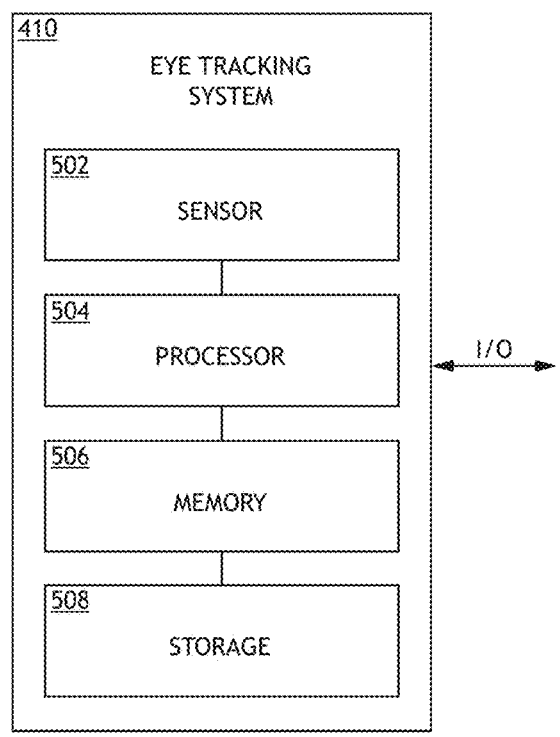
FIG. 5 is a view of the eye tracking system of the head wearable device of FIG. 4 according to the inventive concepts disclosed herein.

The eye tracking system 410 may be configured to track eye gestures, track movement of a user's eye, track a user's gaze, track scan patterns, determine a location of a vergence point (sometimes referred to as a point of regard) of a user's gaze, determine eye locations, track physiological metrics (e.g., blink rate, pupil dilation, time to first fixation, fixation length, and/or fixation count), determine an intra-pupillary distance (IPD) between a user's eyes, determine a direction between a determined location of a user's eye and a determined location of a vergence point for each of a user's eyes, and/or otherwise receive inputs from a user's eyes. The eye tracking system 410 may be configured for performing fully automatic eye tracking operations of users in real time. The eye tracking system 410 may include at least one sensor 502, at least one processor 504, memory 506, and storage 508, as shown in FIG. 5, as well as other components, equipment, and/or devices commonly included in an eye tracking system. The sensor 502, the processor 504, the memory 506, and the storage 508, as well as the other components, equipment, and/or devices commonly included in an eye tracking system may be communicatively coupled.

The eye tracking system 410 may be used as a cursor control device to select virtual content displayed on the display 412. For example, the eye tracking system 410 can be used to select teamed assets in the battlespace, or select items from a virtual menu. The eye tracking system 410 may also be used to trace the user's scan patterns, and alert the user of critical information which has been overlooked.

The processor 504 of the eye tracking system 410 may be configured to process data received from the sensor 502 and output processed data to the processor 402 and/or one of the computing devices 112. For example, the processor 504 may be configured to determine a location of a vergence point of a user's gaze, determine eye locations, determine an intra-pupillary distance (IPD) between a user's eyes, and/or determine a direction between a determined location of a user's eye and a determined location of a vergence point for each of a user's eyes. Additionally, for example, the processor 504 may be configured to generate data associated with such determined information and output the generated data to the processor 402 and/or one of the computing devices 112. The processor 504 of the eye tracking system 410 may be configured to run various software applications or computer code stored in a non-transitory computer-readable medium and configured to execute various instructions or operations. The processor 504 may be implemented as a special purpose processor configured to execute instructions for performing any or all of the operations disclosed throughout.

The display 412 may be configured to receive a stream of images as a stream of image data and present the stream of images to a wearing user of the head wearable device 140. The display 412 may be implemented as any suitable display, such as a see-through display (e.g., Microsoft Hololens) or an occluded display (e.g., Oculus Rift). Additionally, while the display 412 is depicted as a single display, the display 412 may be implemented as a plurality of displays, such as one display for each eye of a user.

The speaker 414 may be configured to receive audio content associated with an environment and to present the audio content as audio to a wearing user of the head wearable device 140. Additionally, while the speaker 414 is depicted as a single speaker, the speaker 414 may be implemented as a plurality of speakers, such as one speaker for each ear of a user.

The camera 416 may be configured to capture real images (e.g., real scene images) of a wearing user's field of view. The camera 416's field of view may align with a wearing user's field of view. The camera 416 may be configured to output the real images as real image data (e.g., real scene image data) to one of the computing devices 112 and/or the processor 402. The camera 416 may be configured to output a stream of real images as a stream of real image data to one of the computing devices 112 and/or the processor 402. In some embodiments, the camera 416 may be implemented as a plurality of cameras.

The voice recognition system 418 may include at least one microphone 702, at least one processor 704, memory 706, and storage 708, as shown in FIG. 7, as well as other components, equipment, and/or devices commonly included in a voice recognition system. The microphone 702, the processor 704, the memory 706, and the storage 708, as well as the other components, equipment, and/or devices commonly included in an eye tracking system may be communicatively coupled. The voice recognition system 418 may be configured to recognize voice commands or audible inputs of a user. The voice recognition system 418 may allow the user to use verbal commands as an interaction and control method. The voice recognition system 418 may be configured to detect user commands and output user command data, which, for example, may be used to provide commands to direct MUM-T operations, which may be visualized on the head wearable device 140. Additionally, verbal commands may be used to modify, manipulate, and declutter content displayed by the head wearable device 140. The voice recognition system 418 may be integrated with the eye tracking system 410 so context of user inputs can be inferred. For example, while looking at a particular UAS 142, the user can say, "Turn to intercept", and one of the processors (e.g., 402, 602, and/or 704) may determine, based at least one the eye tracking data, that the user is implying that the command is intended for the particular UAS 142 without saying the particular UAS 142's call sign. The processor 704 may be configured to process data received from the microphone 702 and output processed data (e.g., text data) to one of the computing devices 112 and/or the processor 402. The processor 704 may be configured to run various software applications or computer code stored in a non-transitory computer-readable medium and configured to execute various instructions or operations.

The biometric sensor 420 may be configured to sense biometric information associated with the user. For example, the biometric sensor may be implemented as a fingerprint reader or a retina scanner.

While the processor 402, the memory 404, the storage device 406, the head tracking system 408, the user input system (e.g., the eye tracking system 410 and/or the voice recognition system 418), the display 412, the speaker 414, the camera 416, and the biometric sensor 420 of the head wearable device 140 have been exemplarily depicted as being implemented as separate devices or subsystems, in some embodiments, some or all of the processor 402, the memory 404, the storage device 406, the head tracking system 408, the user input system (e.g., the eye tracking system 410 and/or the voice recognition system 418), the display 412, the speaker 414, the camera 416, and the biometric sensor 420 may be implemented as a single integrated system or device or as any number of integrated and/or partially integrated subsystems and/or devices.

While the head wearable device 140 exemplarily includes elements as shown, in some embodiments, one or more of the elements of the head wearable device 140 may be omitted, or the head wearable device 140 may include other elements.

Figure 8:
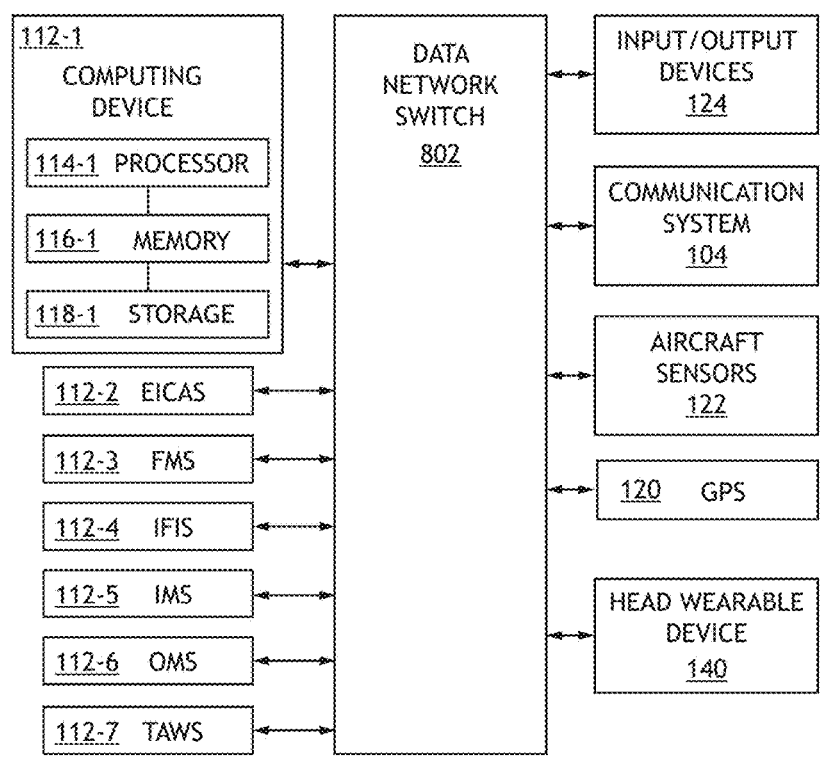
FIG. 8 is a view of exemplary devices of the aircraft of FIG. 1 communicatively coupled via a data network switch according to the inventive concepts disclosed herein.

Referring now to FIG. 8, various exemplary devices of the aircraft 102 of FIG. 1 communicatively coupled via a data network switch 802 (e.g., an avionics full-duplex Ethernet (AFDX) switch) are shown. For example, a plurality of computing devices 112 (e.g., avionics computing devices), the input/output devices 124, the communication system 104, vehicular sensors (e.g., the aircraft sensors 122), the GPS device 120 and the head wearable device 140 may be communicatively coupled via the data network switch 802. Each of the plurality of avionics computing devices (e.g., 112-1, 112-2, 112-3, 112-4, 112-5, 112-6, 112-7), the input/ output devices 124, the communication system 104, vehicular sensors (e.g., the aircraft sensors 122), and the GPS device 120 may be configured to exchange (e.g., send and/or receive) avionics data with one another via the data network switch 802. While the plurality of computing devices 112, the input/output devices 124, the communication system 104, the aircraft sensors 122, the GPS device 120, and the head wearable device 140 are exemplarily shown as being communicatively coupled via the data network switch 802, in some embodiments some or all of the plurality of computing devices 112, the input/output devices 124, the communication system 104, the vehicular sensors (e.g., the aircraft sensors 122), the GPS device 120, and the head wearable device 140 may be communicatively coupled via any suitable data networks and via any suitable data networking components (e.g., at least one bus (e.g., Aeronautical Radio, Incorporated (ARINC) 429 busses), at least one data concentrator, at least one switch, at least one router, or a combination thereof).

The plurality of computing devices 112 may be implemented as and/or include a plurality of vetronics computing devices, such as a plurality of avionics computing devices (e.g., which may be implemented in one or more integrated modular avionics (IMA) cabinets). The plurality of avionics computing devices may include a first avionics computing device 112-1, a crew alerting system (CAS) computing device (e.g., an engine indication and crew alerting system (EICAS) computing device 112-2), a flight management system (FMS) computing device 112-3, an integrated flight information system (IFIS) computing device 112-4, an information management system (IMS) computing device 112-5, an onboard maintenance system (OMS) computing device 112-6, a terrain awareness and warning system (TAWS) computing device 112-7, a secure server router computing device (not shown), an automatic dependent surveillance (ADS) computing device (not shown), and a traffic collision avoidance system (TCAS) computing device (not shown), as well as other avionics computing devices commonly implemented in an aircraft. Additionally, the input/output devices 124, the communication system 104, the aircraft sensors 122, the data network switch 802, and the GPS device 120 may be considered to be devices of the plurality of avionics computing devices and may be implemented similarly as and function similarly as avionics devices (e.g., 112-1, 112-2, 112-3, 112-4, 112-5, 112-6, 112-7) as disclosed throughout. Each of the plurality of avionics computing devices (e.g., 112-1, 112-2, 112-3, 112-4, 112-5, 112-6, 112-7, 112-8) may include components, which may be implemented and function similarly as the components of the computing device 112 shown and described with respect to FIG. 1. As such, each of the plurality of avionics computing devices may include at least one processor, memory, and storage, which may be implemented and function similarly as the processor 114, the memory 116, and the storage 118, respectively, of the computing device 112 shown and described with respect to FIG. 1. For example, the first avionics computing device 112-1 may include a processor 114-1, memory 116-1, and storage 118-1, which may be implemented and function similarly as the processor 114, the memory 116, and the storage 118, respectively, of the computing device 112 shown and described with respect to FIG. 1.

The plurality of avionics computing devices (e.g., 112-1, 112-2, 112-3, 112-4, 112-5, 112-6, 112-7) and/or processors thereof (e.g., 114-1) may be implemented as special purpose computers (e.g., the first avionics computing device 112-1, the EICAS computing device 112-2, the FMS computing device 112-3, the IFIS computing device 112-4, the IMS computing device 112-5, the OMS computing device 112-6, the TAWS computing device 112-7,) and/or special purpose processors (e.g., the processor 114-1 of the first avionics computing device 112-1 programmed to execute instructions for operations as disclosed throughout, a processor of the EICAS computing device 112-2 programmed to execute instructions for performing EICAS operations as disclosed throughout, a processor of the FMS computing device 112-3 programmed to execute instructions for performing FMS operations as disclosed throughout, a processor of the IFIS computing device 112-4 programmed to execute instructions for performing IFIS operations as disclosed throughout, a processor of the IMS computing device 112-5 programmed to execute instructions for performing IMS operations as disclosed throughout, a processor of the OMS computing device 112-6 programmed to execute instructions for performing OMS operations as disclosed throughout, a processor of the TAWS computing device 112-7 programmed to execute instructions for performing TAWS operations as disclosed throughout,) configured to execute instructions for performing any or all of the operations disclosed throughout.

Additionally, in some embodiments, the data network switch 802 may be implemented similarly as and function similarly to one of the avionics computing devices (e.g., 112-1, 112-2, 112-3, 112-4, 112-5, 112-6, 112-7) or include components that function similarly to components of one of the avionics computing devices. For example, the data network switch 802 may include an integrated computing device (which may be implemented and function similarly to one of the computing devices 112 (e.g., one of the avionics computing devices (e.g., 112-1, 112-2, 112-3, 112-4, 112-5, 112-6, 112-7))) and/or integrated computing device components (which may be implemented and function similarly to components of one of the computing devices 112 of FIG. 1).

Further, while the plurality of avionics computing devices has been exemplarily depicted and described with respect to FIG. 8 as including the first avionics computing device 112-1, the EICAS computing device 112-2, the FMS computing device 112-3, the IFIS computing device 112-4, the IMS computing device 112-5, the OMS computing device 112-6, and the TAWS computing device 112-7, in some embodiments, the plurality of avionics computing devices may omit one or more of the described and depicted avionics computing devices, include additional numbers of such avionics computing devices, and/or include other types of suitable avionics computing devices.

Figure 9:
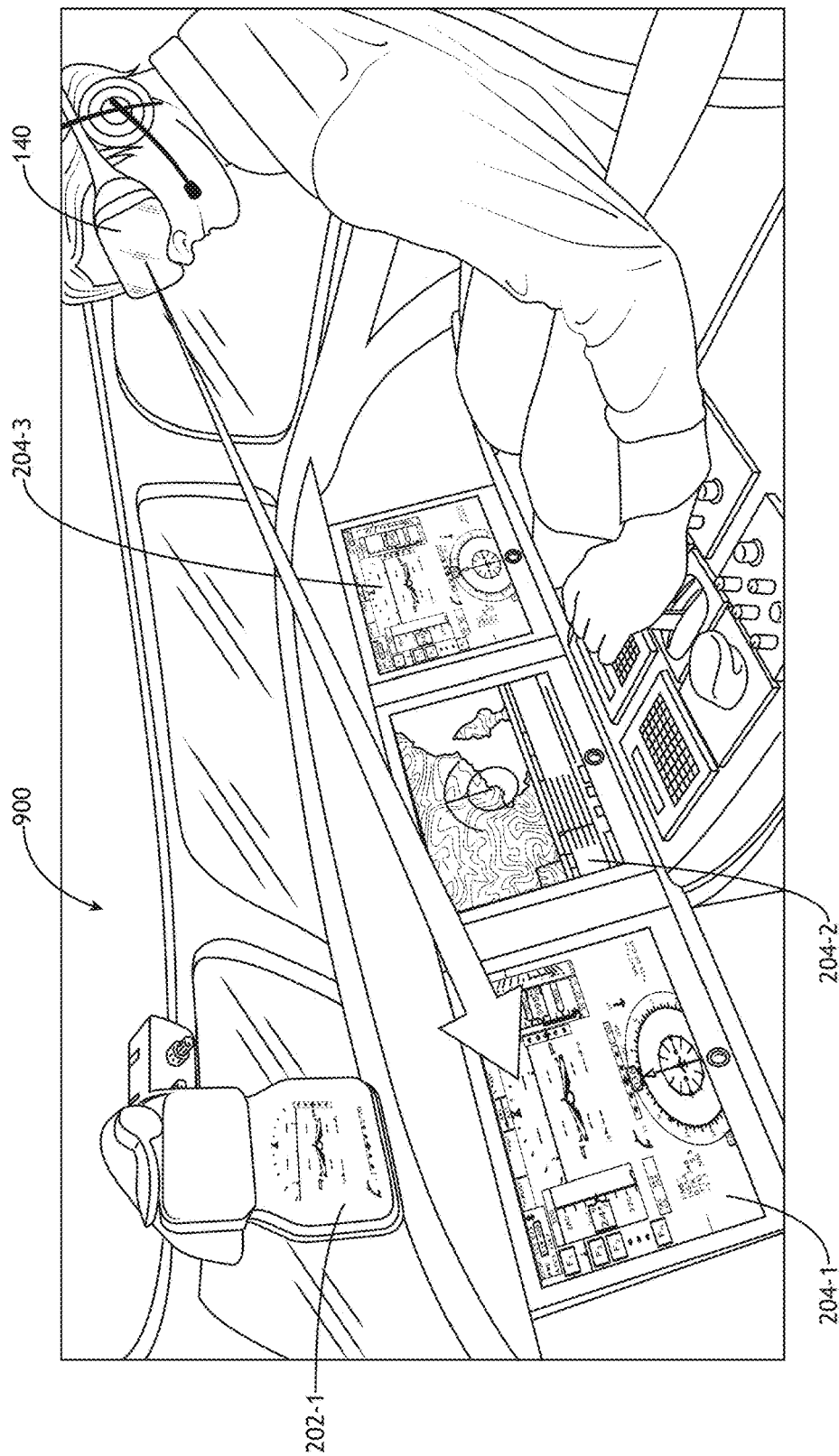
FIG. 9 is a view of a pilot wearing the head wearable device in a cockpit of the aircraft of FIG. 1 according to the inventive concepts disclosed herein.

Referring now to FIG. 9, a pilot wearing the head wearable device 140 in a cockpit 900 of the aircraft 102 of FIG. 1 is shown. Content displayed by the head wearable device 140 and content displayed by one or more of displays (e.g., HDD 204-1, HDD 204-2, HDD 204-3 and/or HUD 202-1) of the cockpit 900 may be synched such that the pilot, by using the head wearable device 140 and/or one or more of the displays of the cockpit 900, can select a teamed asset and a format will be displayed adjacent to that asset, for example, to present sensor feeds, targeting information, streaming video, images, voice, or other data from the selected teamed asset. In some embodiments, the content displayed by the head wearable device 140 and the content displayed by one or more of displays of the cockpit 900 provide a seamless transition between what virtual content the pilot is seeing on the head wearable device 140 and the HDDs 204-1, 204-2, 204-3. In some embodiments, one of the HDDs 204 may display a menu with user-selectable options to filter what content is displayed on the display 412 of the head wearable device 140. For example, the HDD menu may provide user-selectable modes for the pilot to declutter content such as friendly forces, enemy forces, ground assets, air assets, engagement areas, and/or sensor and weapon ranges, for example, based on the pilot's preference. Additionally, the head wearable device 140 and the HDDs 204 may offer complementary features so that the operator can easily switch between head-up and head down operations. For example, when an object or asset is selected on the head wearable device 140 or one of the HDDs 204, the selected object or asset may also be highlighted to the pilot on the other display device. Additionally, for example, when the pilot directs a scenario or commands an asset depicted by the head wearable device 140, a corresponding change may be displayed on one of the HDDs 204, and vice-a-versa. Further, for example, if the pilot selects an asset's sensor feed, targeting feed, or video feed via the head wearable device 140, one of the HDDs 204 may display a magnified or enlarged version of the selected feed. Similarly, if the pilot selects a feed via one of the HDDs 204, the head wearable device 140 may show that feed on the head wearable device 140.

Figure 10:
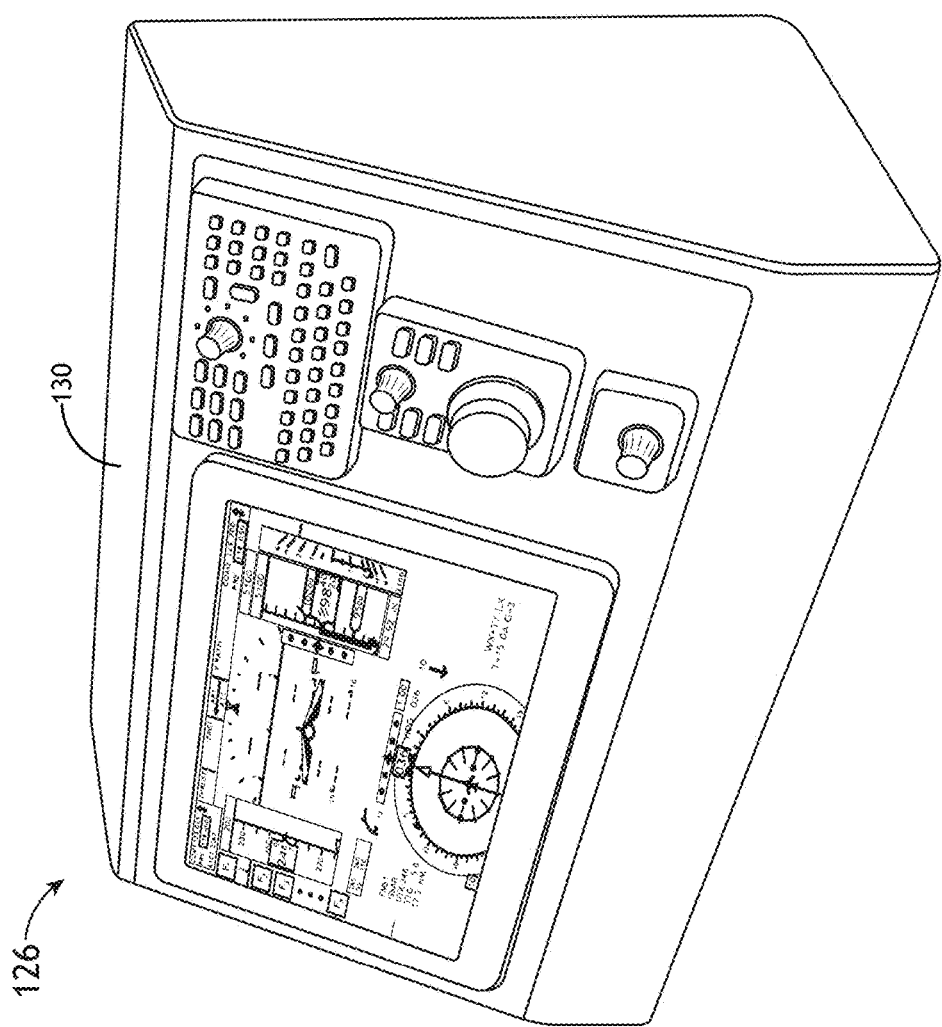
FIG. 10 is a view of a computing device having an integrated HDD of the control station 126 of FIG. 1 according to the inventive concepts disclosed herein.

Referring now to FIG. 10, an operator wearing the head wearable device 144 may interface with a computing device 130 having an integrated HDD of the control station 126 of FIG. 1 is shown. Content displayed by the head wearable device 144 and content displayed by computing device 130 with the integrated HDD may be synched, similarly as described with respect to FIG. 9. For example, the operator, by using the head wearable device 144 and/or HDD of the computing device 130, can select a teamed asset and a format will be displayed adjacent to that asset, for example, to present sensor feeds, targeting information, streaming video, images, voice, or other data from the selected teamed asset.

Referring now to FIGS. 11-18, views of various exemplary images displayed by the display 412 of the head wearable device 140 are shown.

Figure 11:
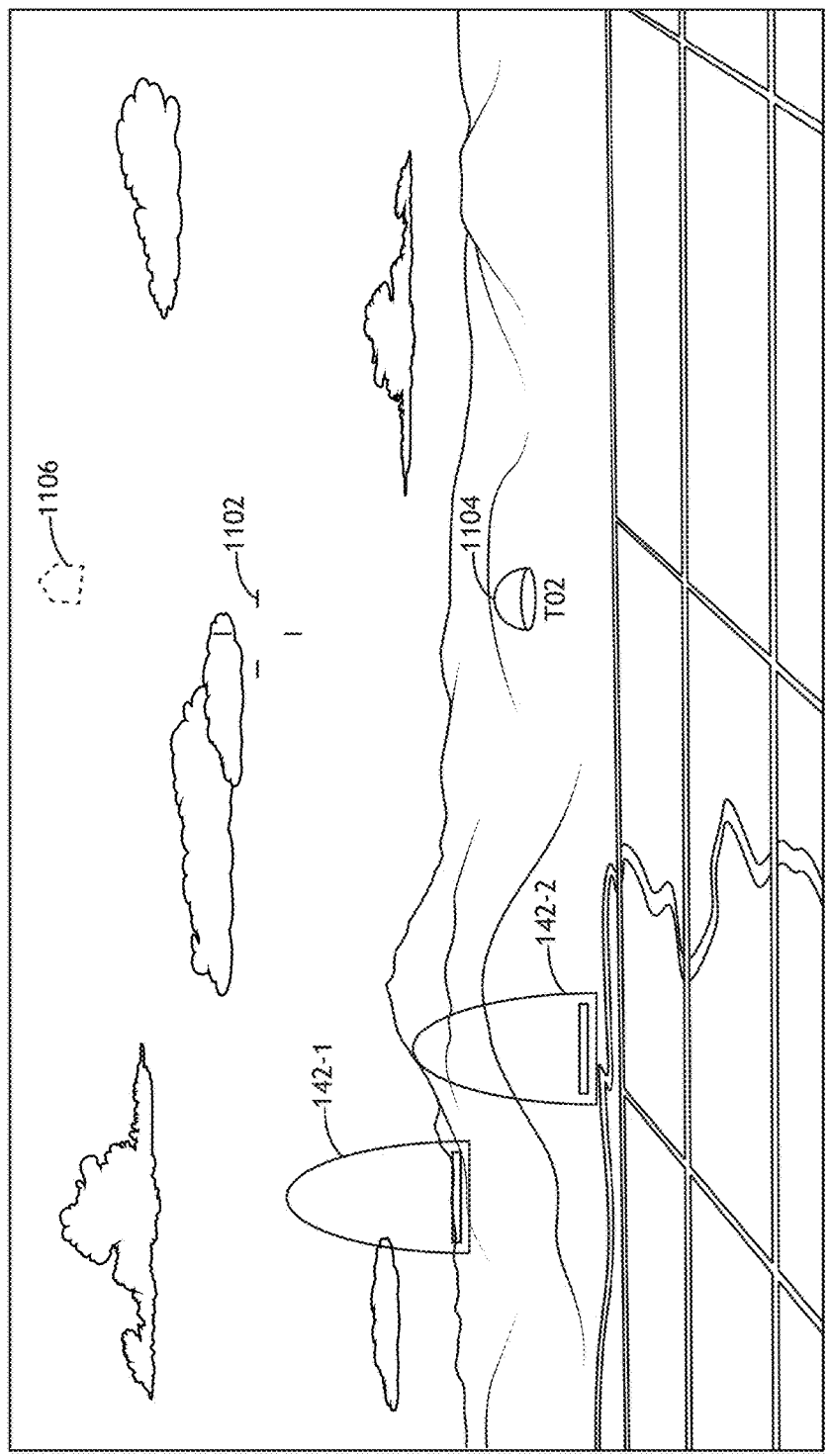
FIG. 11 is a view of a view of an exemplary image displayed by the display of the head wearable device of FIG. 1 according to the inventive concepts disclosed herein.

Referring now to FIG. 11, a view of an exemplary image displayed by the display 412 of the head wearable device 140 is shown. The image includes two user-selectable depictions of two unmanned vehicles (e.g., teamed UASs 142-1, 142-2), an eye tracking cursor 1102, a user-selectable depiction of an unknown threat 1104, and a user-selectable depiction of an enemy asset 1106 (e.g., an enemy aircraft).

Figure 12:
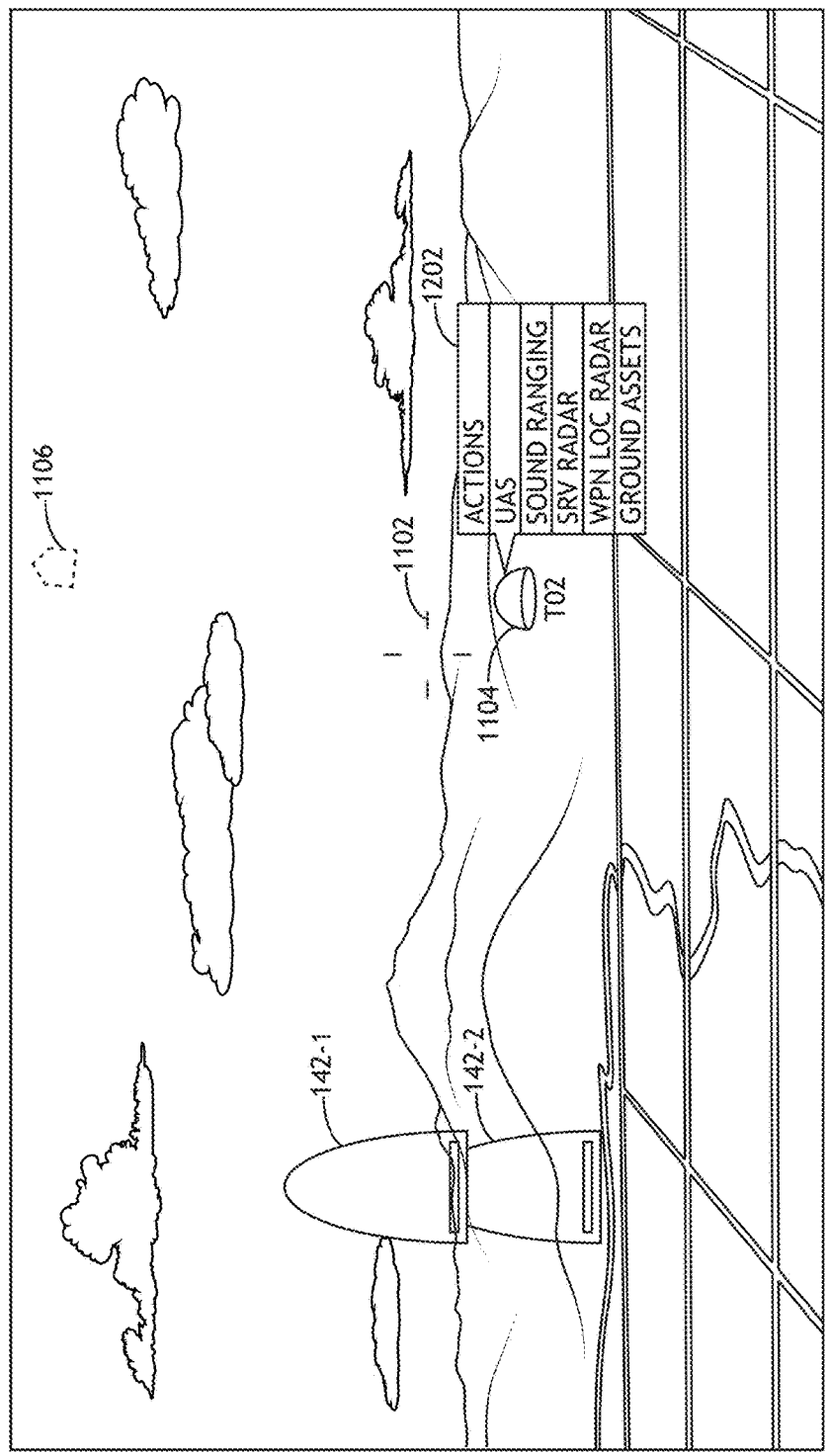
FIG. 12 is a view of a view of an exemplary image displayed by the display of the head wearable device of FIG. 1 according to the inventive concepts disclosed herein.

Referring now to FIG. 12, a view of an exemplary image displayed by the display 412 of the head wearable device 140 is shown. By looking near the user-selectable depiction of the unknown threat 1104 and/or by speaking a voice command, the user input system (e.g., the eye tracking system 410 and/or the voice recognition system 418) may output user selection data to the processor 402 indicative of the user selecting the user-selectable depiction of the unknown threat 1104. In response, the processor 402 may update the stream of image data to include graphical content of an actions menu 1202 and output the updated stream of image data to the display 412. The actions menu 1202 may include one or more user-selectable options (e.g., actions), such as to send a UAS, to perform sound ranging, to perform surveillance radar, to perform weapon location radar, and/or to send ground assets.

Figure 13:
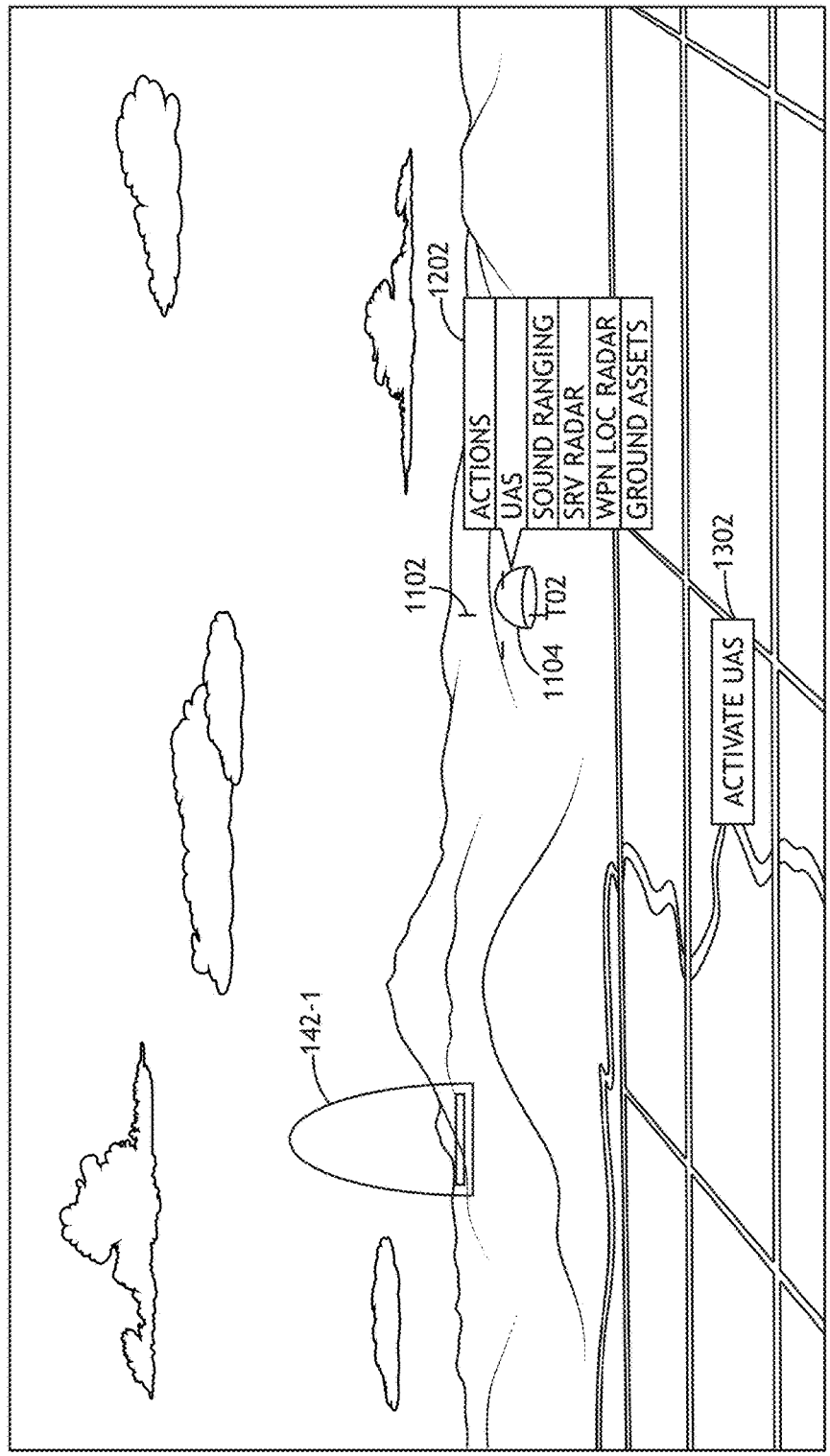
FIG. 13 is a view of a view of an exemplary image displayed by the display of the head wearable device of FIG. 1 according to the inventive concepts disclosed herein.

Referring now to FIG. 13, a view of an exemplary image displayed by the display 412 of the head wearable device 140 is shown. By utilizing the user input system (e.g., the eye tracking system 410 and/or the voice recognition system 418), the user of the head wearable device 140 may select an item from a list (e.g., the actions menu 1202). For example, by utilizing the eye tracking system 410, the user of the head wearable device 140 may select an item from a list (e.g., the actions menu 1202) by looking at the item, and the user may confirm the selection by using a second user input, such as a voice command (e.g., via the voice recognition system 418) or by pressing a button. For example, by utilizing the voice recognition system 418, the user of the head wearable device 140 may select an item from a list (e.g., the actions menu 1202) by speaking a voice command to select the item, and optionally, the user may confirm the selection by using a second user input, such as a another voice command (e.g., via the voice recognition system 418) or by pressing a button. Additionally, for example, by looking near the user-selectable option of "UAS" and/or by speaking a voice command, the user input system (e.g., the eye tracking system 410 and/or the voice recognition system 418) may output user selection data to the processor 402 indicative of the user selecting the user-selectable option to activate a "UAS". In response, the processor 402 may update the stream of image data to include graphical content of an "ACTIVATE UAS" confirmation 1302 and output the updated stream of image data to the display 412.

Figure 14:
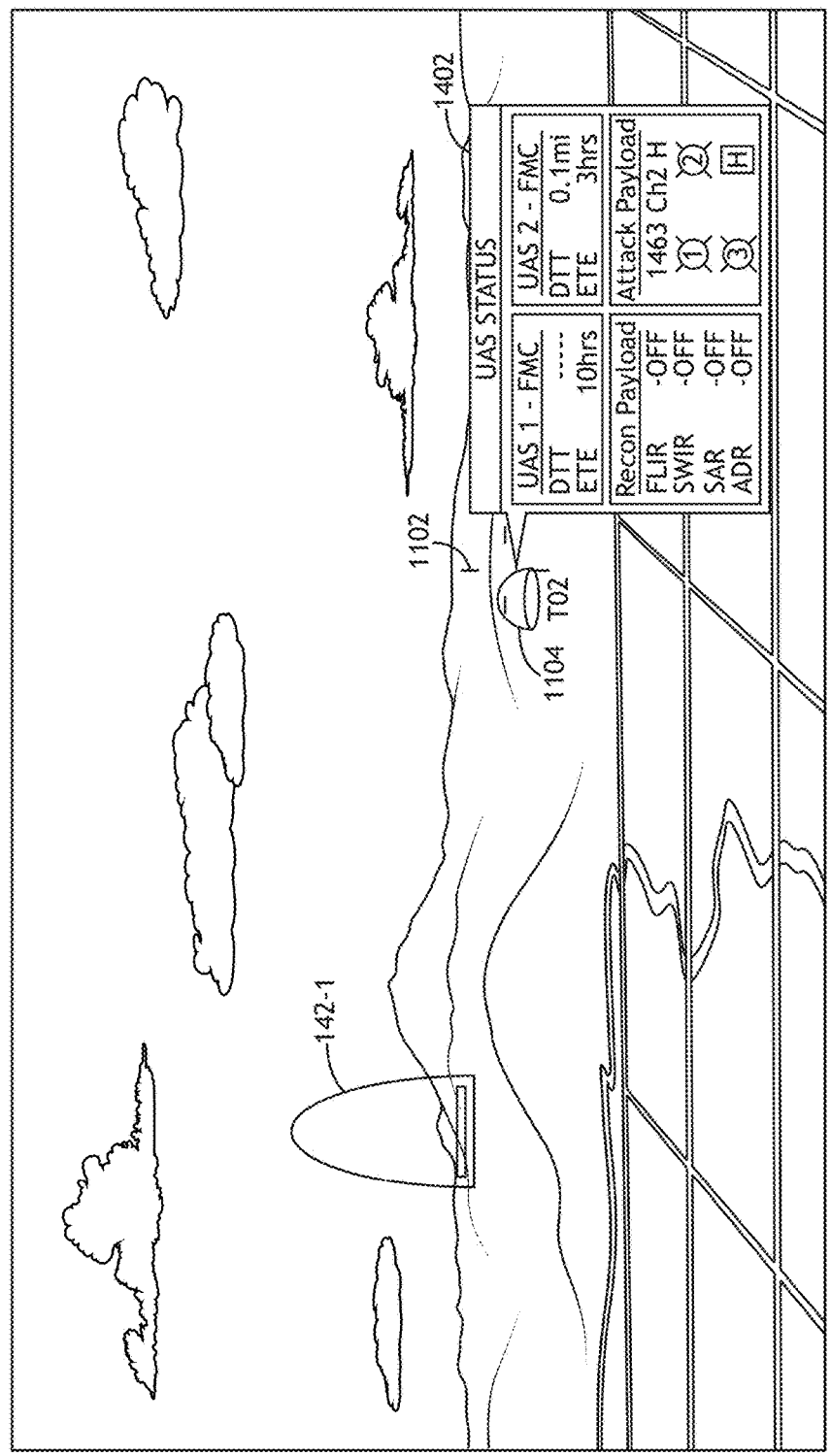
FIG. 14 is a view of a view of an exemplary image displayed by the display of the head wearable device of FIG. 1 according to the inventive concepts disclosed herein.

Referring now to FIG. 14, a view of an exemplary image displayed by the display 412 of the head wearable device 140 is shown. In response to the user selecting the user-selectable option to send a "UAS", the processor 402 may update the stream of image data to include graphical content of user-selectable "UAS STATUS" information 1402. The UAS Status information 1402 may include information related to UASs 142-1 and UAS 142-2, which are in the vicinity of the unknown threat 1104. For example, the UAS Status information 1402 may include information associated with each UAS's location, estimated time to arrive at the unknown threat 1104, a reconnaissance payload (e.g., types of optical sensors and surveillance sensors onboard), and an attack payload (e.g., types and quantities of weapons onboard).

Figure 15:
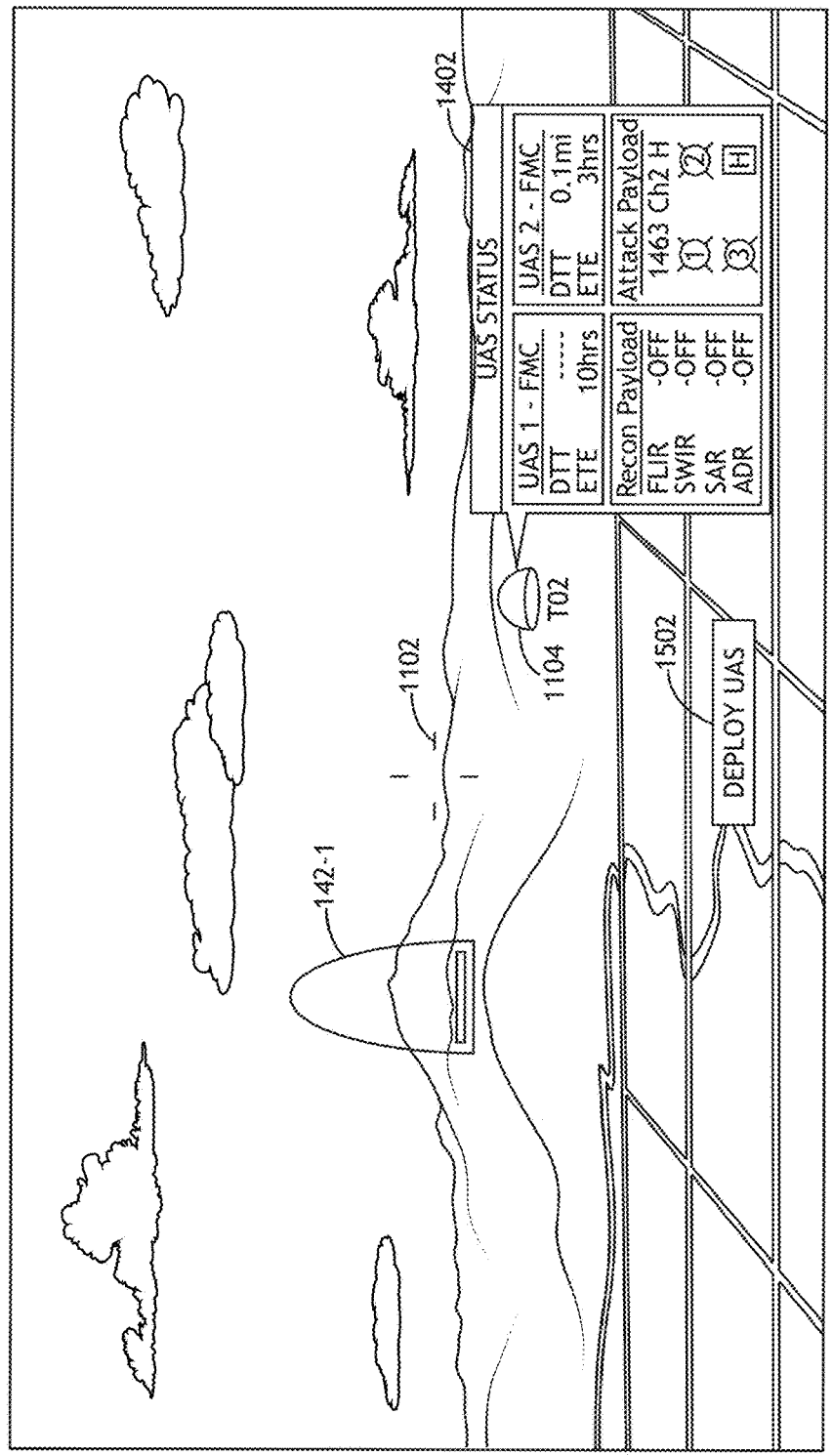
FIG. 15 is a view of a view of an exemplary image displayed by the display of the head wearable device of FIG. 1 according to the inventive concepts disclosed herein.

Referring now to FIG. 15, a view of an exemplary image displayed by the display 412 of the head wearable device 140 is shown. By looking near the user-selectable option of a particular UAS of the UAS Status information 1402 and/or by speaking a voice command, the user input system (e.g., the eye tracking system 410 and/or the voice recognition system 418) may output user selection data to the processor 402 indicative of the user selecting a particular "UAS" to deploy. In response, the processor 402 may update the stream of image data to include graphical content of a "DEPLOY UAS" confirmation 1502 and output the updated stream of image data to the display 412. Additionally, the processor 402 may output a command to deploy the particular UAS.

Figure 16:
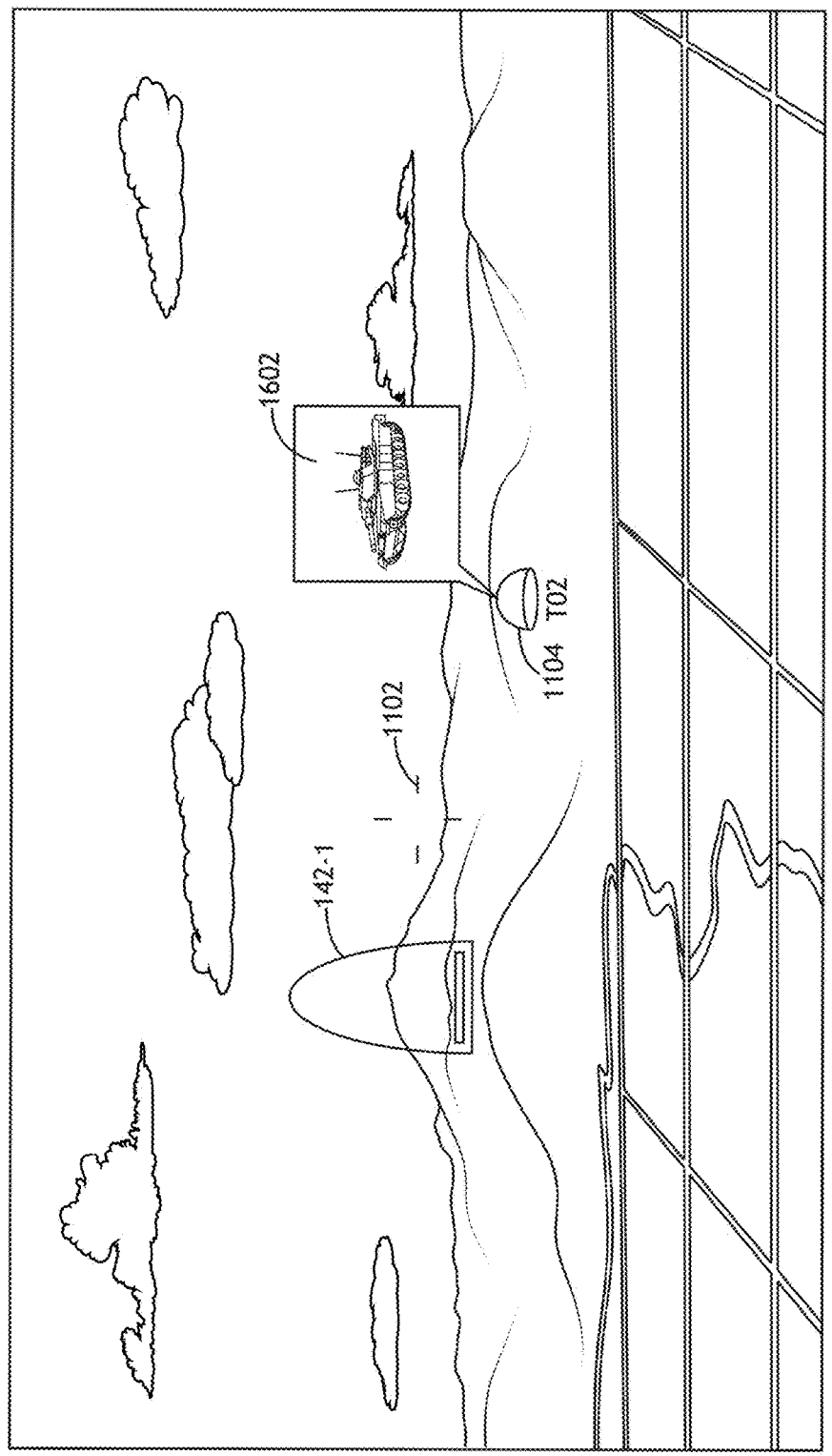
FIG. 16 is a view of a view of an exemplary image displayed by the display of the head wearable device of FIG. 1 according to the inventive concepts disclosed herein.

Referring now to FIG. 16, a view of an exemplary image displayed by the display 412 of the head wearable device 140 is shown. Upon the deployed UAS surveilling the unknown threat 1104, the deployed UAS may transmit sensor feed data (e.g., from optical sensors and/or surveillance sensors), which may be routed to the head wearable device 140. Upon receiving the sensor feed data from the deployed UAS, the processor 402 may update the stream of image data to include sensor feed graphical content 1602 associated with the sensor feed data, and such graphical content may be depicted alongside the unknown threat 1104. For example, the sensor feed graphical content 1602 may include images of the unknown threat 1104.

Figure 17:
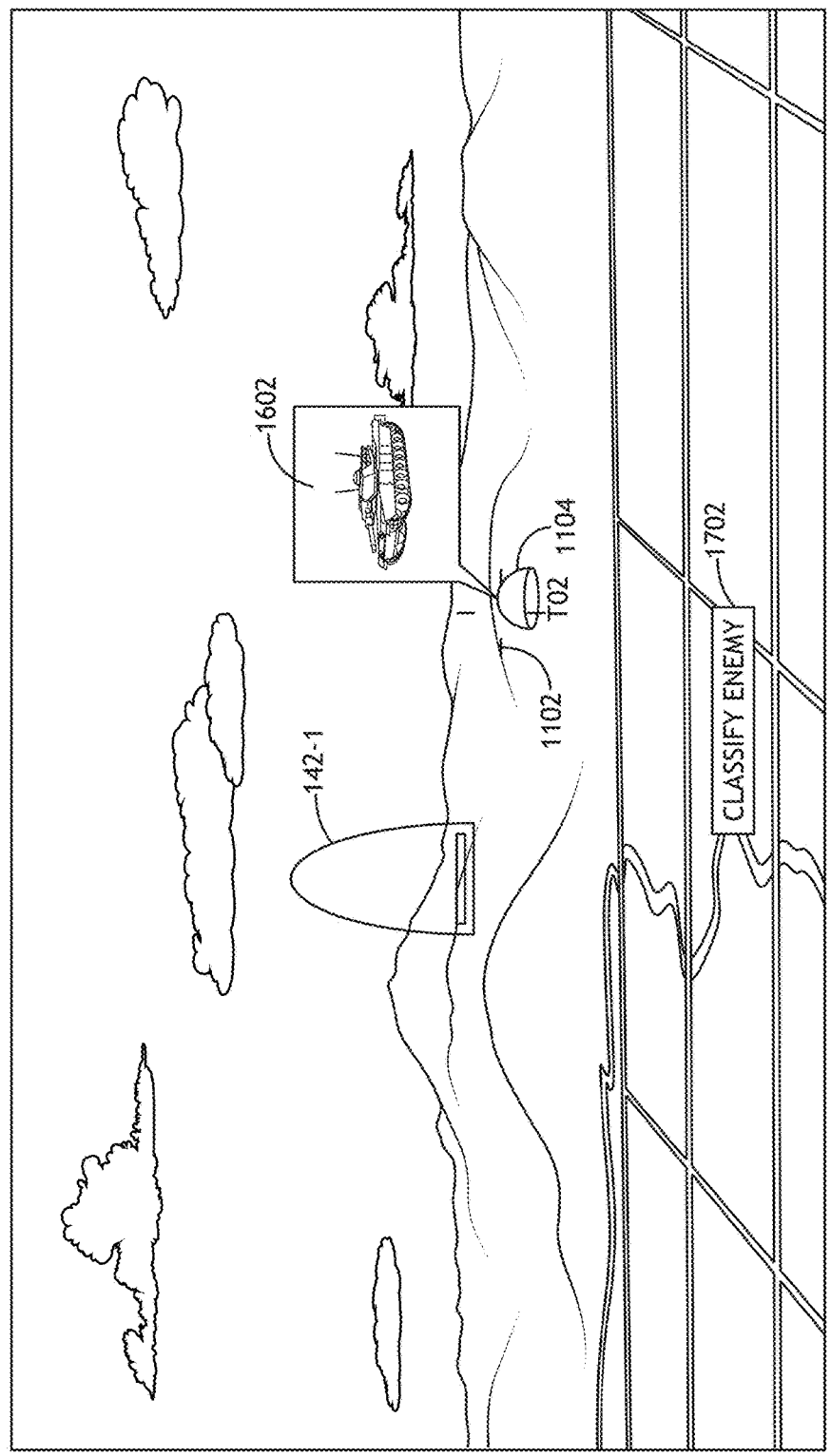
FIG. 17 is a view of a view of an exemplary image displayed by the display of the head wearable device of FIG. 1 according to the inventive concepts disclosed herein.

Referring now to FIG. 17, a view of an exemplary image displayed by the display 412 of the head wearable device 140 is shown. By looking near the user-selectable depiction of the unknown threat 1104 and/or by speaking a voice command, the user input system (e.g., the eye tracking system 410 and/or the voice recognition system 418) may output user command data to the processor 402 indicative of the user commanding that the unknown threat 1104 be classified as an enemy. In response, the processor 402 may update the stream of image data to include graphical content of a "CLASSIFY ENEMY" confirmation 1702 and output the updated stream of image data to the display 412. Additionally, the processor 402 may route the command to classify as an enemy to another computing device (e.g., 112) onboard the aircraft 102 or a device off of the aircraft 102.

Figure 18:
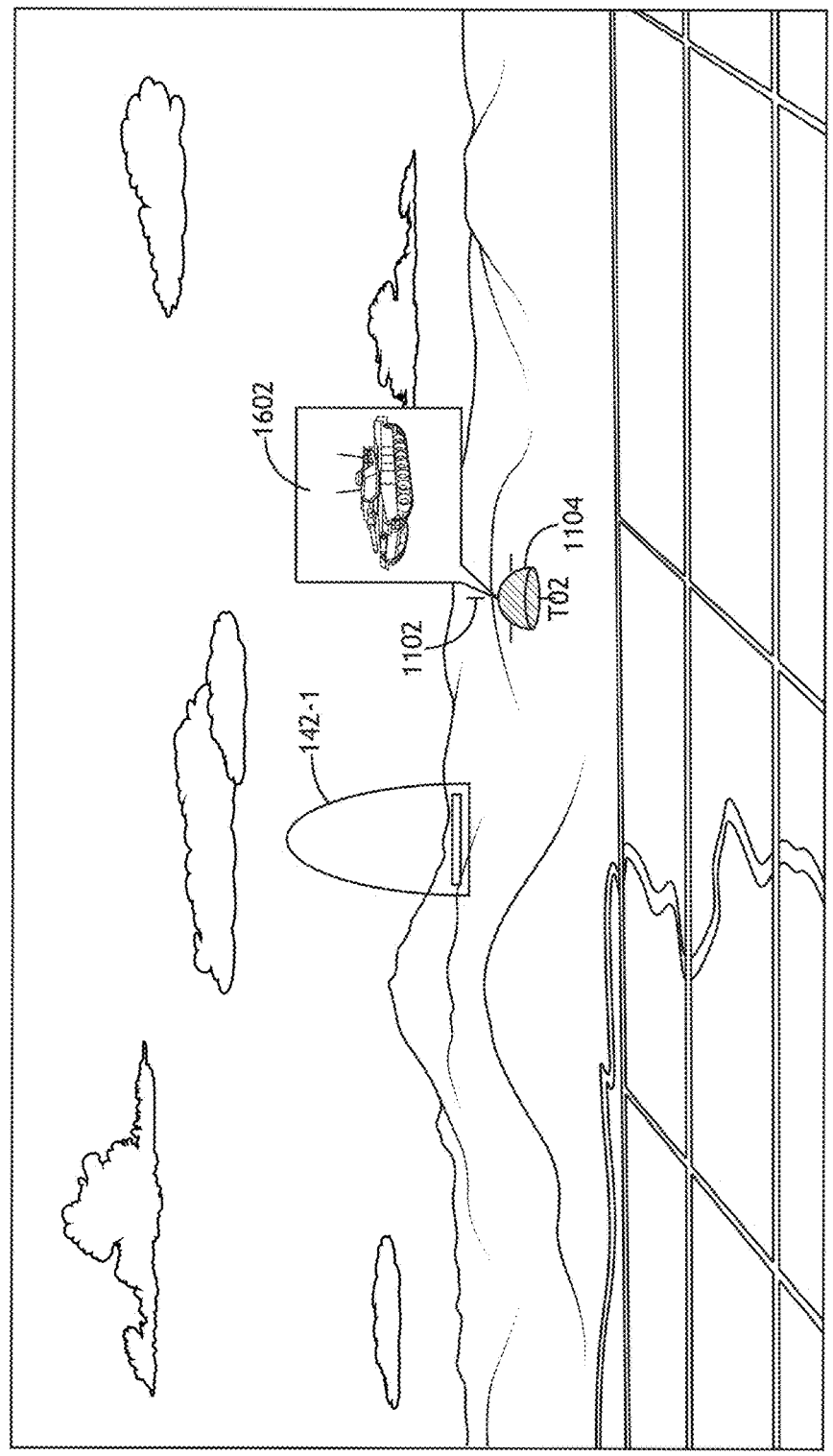
FIG. 18 is a view of a view of an exemplary image displayed by the display of the head wearable device of FIG. 1 according to the inventive concepts disclosed herein.

Referring now to FIG. 18, a view of an exemplary image displayed by the display 412 of the head wearable device 140 is shown. In response to the classify as an enemy command, the processor 402 may update the stream of image data, such that the user-selectable depiction of the unknown threat 1104 is updated to be indicative of an enemy classification, and output the updated stream of image data to the display 412. For example, by classifying the user-selectable depiction of the unknown threat 1104 as an enemy, the color of the user-selectable depiction of the unknown threat 1104 may change to red (for enemy) from yellow (for unknown), whereas teamed or friendly assets may be depicted as green.

While FIGS. 11-18 depict views of various exemplary images displayed by the display 412 of the head wearable device 140 for one possible sequence of actions, those of ordinary skill in the art will appreciate that the head wearable device 140 according to the inventive concepts disclosed herein may be used by an operator for any of various scenarios, such as for facilitating other MUM-T operations.

For example, in one exemplary scenario of facilitating MUM-T operations, a manned operator of the aircraft 102 may be responsible for piloting the aircraft 102 and for controlling four unmanned teamed assets (e.g., four UASs 142). The aircraft 102 may be flying in a congested battlespace in a formation such that the four UASs 142 are flying ahead of the manned aircraft 102. The operator may be wearing the head wearable device 140, which, for example, may be implemented as an augmented reality head wearable device with a see-through display. As the operator is flying, the operator can use the augmented reality head wearable device's overlaid graphical symbology to keep the operator's eyes focused out of the cockpit while being able to quickly locate team members, as well as other friendly, enemy, unknown, and neutral ground and air assets. As the operator scans the airspace, virtual symbols are displayed by the head wearable device 140 360° about the aircraft, overlaid on top of real aircraft locations. This allows the operator to visualize the location of battlespace assets, even if the assets are beyond the operator's natural line of sight. If the operator looks at one of the teamed assets (e.g., UASs 142), additional symbology appears providing information about the assets current operational and sensor system status. Additionally, the head wearable device 140 may displays a yellow dome on the ground, indicating an unknown ground threat. The operator may look at the displayed yellow dome to select the virtual symbol associated with the unknown threat. When the yellow dome is selected, the head wearable device 140 may display a menu indicating available team assets (e.g., UASs 142) that the operator can deploy to capture intelligence on the unknown threat. The operator can select (e.g., via the eye tracking system 410 and/or the voice recognition system 418) an item from the menu. For example, the operator may select "Deploy UAS 1 FLIR able" to dispatch one of the UASs 142 configured with FLIR cameras. Once the operator dispatches a teamed asset, a command is sent to the teamed asset so that the teamed asset automatically performs the desired action. Once the deployed asset is close enough to collect intelligence on the unknown threat, the sensor information may be transmitted to the aircraft 102 manned by the operator, and a video feed of the sensor information may be displayed by the head wearable device 140 in a small window near (e.g., adjacent and/or above) the yellow dome indicating the unknown threat. Once the user views the video of the sensor information, the operator can use a voice command (e.g., via the voice recognition system 418) to classify the unknown threat as friendly, enemy, neutral. For example, the voice command may be "Classify Enemy" to classify the unknown threat as an enemy.

Referring now to FIG. 19, an exemplary embodiment of a method 1900 according to the inventive concepts disclosed herein may include one or more of the following steps. Additionally, for example, some embodiments may include performing one more instances of the method 1900 iteratively, concurrently, and/or sequentially. Additionally, for example, at least some of the steps of the method 1900 may be performed in parallel and/or concurrently. Additionally, in some embodiments, at least some of the steps of the method 1900 may be performed non-sequentially.

A step 1902 may include outputting, by at least one processor of a head wearable device, a stream of image data to a display of the head wearable device for presentation to a user of the head wearable device, the image data associated with images aligned with a determined position and a determined orientation of a head of the user relative to an environment, the images including at least one user-selectable depiction of at least one unmanned vehicle.

A step 1904 may include receiving, by the at least one processor of the head wearable device, user input data from a user input system, wherein the user input data includes user selection data associated with a selected unmanned vehicle of the at least one unmanned vehicle.

A step 1906 may include updating, by the at least one processor of the head wearable device, the stream of image data associated with the images such that the images further include a depiction of information associated with the selected unmanned vehicle.

Further, the method may include any of the operations disclosed throughout.

As will be appreciated from the above, embodiments of the inventive concepts disclosed herein may be directed to a method, a system, and at least one head wearable device.

As used throughout and as would be appreciated by those skilled in the art, "at least one non-transitory computer-readable medium" may refer to as at least one non-transitory computer-readable medium (e.g., memory 110, memory 116, memory 212, memory 404, memory 506, memory 606, memory 706, memory 116-1, storage 118, storage 214, storage 406, storage 508, storage 608, storage 708, or a combination thereof; e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A head wearable device, comprising:
   a display implemented in or on the head wearable device, the display configured to present imagery to a user of the head wearable device;
   a head tracking system implemented in or on the head wearable device, the head tracking system configured to:
   determine a position and an orientation of a head of the user of the head wearable device relative to an environment; and
   output position and orientation data associated with the determined position and the determined orientation of the head of the user relative to the environment;
   a user input system comprising at least one of an eye tracking system or a voice recognition system, the user input system configured to:

detect user inputs of the user of the head wearable device; and
output user input data; and
at least one processor communicatively coupled to the head tracking system, the user input system, and the display, the at least one processor configured to:
output a stream of image data to the display for presentation to the user, the image data associated with images aligned with the determined position and the determined orientation of the head of the user relative to the environment, the images including at least one user-selectable depiction of at least one teamed asset;
receive the user input data from the user input system, wherein the user input data includes user selection data associated with a selected teamed asset of the at least one teamed asset; and
update the stream of image data associated with the images such that the images further include a depiction of information associated with the selected teamed asset.

2. The head wearable device of claim 1, wherein the depiction of information associated with the selected teamed asset includes a depiction of sensor feed data captured by at least one sensor of the selected teamed asset.

3. The head wearable device of claim 1, wherein the information associated with the selected teamed asset includes information of at least one of status, tasks, or capabilities of the selected teamed asset.

4. The head wearable device of claim 1, wherein the user input data further includes user command data associated with a command to control or manage the selected teamed asset, wherein the at least one processor is further configured to:
output a command to control or manage the selected teamed asset.

5. The head wearable device of claim 1, wherein the image data is battlespace image data associated with images of a battlespace.

6. The head wearable device of claim 5, wherein the images associated with the image data further include at least one depiction of at least one battlespace feature.

7. The head wearable device of claim 5, wherein the images associated with the image data further include at least one user-selectable depiction of at least one battlespace object, wherein the user input data further includes user selection data associated with a selected battlespace object of the at least one battlespace object, wherein the at least one processor is further configured to:
update the stream of image data associated with the images such that the images further include a depiction of information associated with the selected battlespace object.

8. The head wearable device of claim 7, wherein the user input data further includes user command data associated with a command to surveil the selected battlespace object, wherein the at least one processor is further configured to:
output a command to control or manage a particular teamed asset of the at least one teamed asset to surveil the selected battlespace object.

9. The head wearable device of claim 7, wherein the user input data further includes user command data associated with a command to attack the selected battlespace object, wherein the at least one processor is further configured to:
output a command to control a particular teamed asset of the at least one teamed asset to attack the selected battlespace object.

10. The head wearable device of claim 7, wherein each of the at least one user-selectable depiction of the at least one battlespace object includes graphical information indicative of whether each of the at least one battlespace object is classified as friendly, neutral, enemy, or unknown threat.

11. The head wearable device of claim 10, wherein the selected battlespace object is currently classified as unknown threat, wherein the user input data further includes user command data associated with a command to classify the selected battlespace object, wherein the at least one processor is further configured to:
output a command to classify the selected battlespace object as friendly, neutral, or enemy.

12. The head wearable device of claim 1, wherein the display is an augmented reality display.

13. The head wearable device of claim 12, wherein the display is linked to a head down display configured to simultaneously present, to the user, information synched with the head wearable device.

14. The head wearable device of claim 1, wherein the display is a virtual reality display.

15. The head wearable device of claim 1, wherein the head wearable device is implemented onboard an aircraft, wherein the head wearable device is worn by the user onboard the aircraft.

16. The head wearable device of claim 1, wherein the head wearable device is implemented at a control station, wherein the head wearable device is worn by the user at the control station.

17. The head wearable device of claim 1, wherein the images include a depiction of information classified to a predetermined classification level, wherein the head wearable device is implemented in an unclassified environment, wherein the images are only viewable by the user of the head wearable device.

18. The head wearable device of claim 1, further comprising a biometric sensor configured to sense biometric information associated with the user, wherein the at least one processor is further configured to verify an identity of the user of the head wearable device based at least on the biometric information and determine a predetermined classification level of the user based at least on the identity, wherein the stream of image data output to the display corresponds to the predetermined classification level of the user.

19. A method, comprising:
outputting, by at least one processor of a head wearable device, a stream of image data to a display of the head wearable device for presentation to a user of the head wearable device, the image data associated with images aligned with a determined position and a determined orientation of a head of the user relative to an environment, the images including at least one user-selectable depiction of at least one teamed asset;
receiving, by the at least one processor of the head wearable device, user input data from a user input system, wherein the user input data includes user selection data associated with a selected teamed asset of the at least one teamed asset; and
updating, by the at least one processor of the head wearable device, the stream of image data associated with the images such that the images further include a depiction of information associated with the selected teamed asset.

20. A system, comprising:
a computing device comprising a processor, the processor configured to output data; and a head wearable device communicatively coupled to the computing device, the head wearable device comprising:
    a display implemented in or on the head wearable device, the display configured to present imagery to a user of the head wearable device;
    a head tracking system implemented in or on the head wearable device, the head tracking system configured to:
        determine a position and an orientation of a head of the user of the head wearable device relative to an environment; and
        output position and orientation data associated with the determined position and the determined orientation of the head of the user relative to the environment;
    a user input system comprising at least one of an eye tracking system or a voice recognition system, the user input system configured to:
        detect user inputs of the user of the head wearable device; and
        output user input data;
    at least one processor communicatively coupled to the head tracking system, the user input system, and the display, the at least one processor configured to:
        receive the data from the processor of the computing device;
        based at least in part on the received data, output a stream of image data to the display for presentation to the user, the image data associated with images aligned with the determined position and the determined orientation of the head of the user relative to the environment, the images including at least one user-selectable depiction of at least one teamed asset;
        receive the user input data from the user input system, wherein the user input data includes user selection data associated with a selected teamed asset of the at least one teamed asset; and
        update the stream of image data associated with the images such that the images further include a depiction of information associated with the selected teamed asset.

\* \* \* \* \*